US011976868B2

(12) United States Patent
Griffiths et al.

(10) Patent No.: US 11,976,868 B2
(45) Date of Patent: May 7, 2024

(54) ICE SHAVER WITH IN-LINE POWER CONTROL DRIVE SYSTEM

(71) Applicant: Pioneer Family Brands, Inc., Salt Lake City, UT (US)

(72) Inventors: Donald Griffiths, Salt Lake City, UT (US); Robin Peng, Sandy, UT (US)

(73) Assignee: Pioneer Family Brands, Inc., Salt Lake City, UT (US)

( * ) Notice: Subject to any disclaimer, the term of this patent is extended or adjusted under 35 U.S.C. 154(b) by 327 days.

(21) Appl. No.: 17/407,313

(22) Filed: Aug. 20, 2021

(65) Prior Publication Data

US 2023/0055322 A1 Feb. 23, 2023

(51) Int. Cl.
*F25C 5/12* (2006.01)
*A23G 9/04* (2006.01)
*A23G 9/08* (2006.01)
*A23G 9/22* (2006.01)

(52) U.S. Cl.
CPC ............... *F25C 5/12* (2013.01); *A23G 9/045* (2013.01); *A23G 9/08* (2013.01); *A23G 9/228* (2013.01)

(58) Field of Classification Search
CPC .... F25C 5/12; F25C 5/02; F25C 5/043; F25C 5/046; F25C 5/045; F04D 7/045
See application file for complete search history.

(56) References Cited

U.S. PATENT DOCUMENTS 1,428,829 A * 9/1922 Anderson .................. F25C 5/12
241/DIG. 17
2,572,378 A 10/1951 Milton
2,852,201 A * 9/1958 Bert .......................... F25C 5/12
241/DIG. 17
3,552,663 A * 1/1971 Royals ...................... F25C 5/12
241/278.1
4,113,190 A * 9/1978 Fudman .................. B02C 18/12
D7/374

(Continued)

FOREIGN PATENT DOCUMENTS

DE 102018108038 B3 9/2019
JP 2015064198 A 4/2015

(Continued)

OTHER PUBLICATIONS

Hatsuyuki, Product Manual for Ice Shaver—Model HF-500E, https://www.hatsuyuki.jp/product/hatsuyuki/02/pdf/product_05_manual.pdf, Jan. 14, 2021, Japan.

(Continued)

*Primary Examiner* — Faye Francis

(74) *Attorney, Agent, or Firm* — Thorpe North & Western, LLP; Peter M. de Jonge; Kurt Hendricks

(57) ABSTRACT

The present invention provides an ice shaver with a power control drive system to rotate the ice block and blade with respect to one another and to press the ice block and the blade together. The power drive system includes an in-line, over-center, linear throw column extending through an opening in an enclosure and carrying a spike plate. A motor is carried by and contained with the column and movable with the column toward a shave deck with a blade. A perimeter size and shape of the column matches a perimeter size and shape of the opening. The column substantially closes the opening in the enclosure.

20 Claims, 16 Drawing Sheets

(56) References Cited

U.S. PATENT DOCUMENTS

| | | | |
|---|---|---|---|
| 4,718,610 A * | 1/1988 | Gallaher | F25C 5/12 241/285.2 |
| 5,402,949 A | 4/1995 | Berner et al. | |
| 6,012,660 A | 1/2000 | Colman | |
| 6,328,236 B1 | 12/2001 | Upson | |
| 6,450,426 B1 | 9/2002 | Lee | |
| 6,527,212 B2 | 3/2003 | Rupp | |
| 7,568,667 B1 | 8/2009 | Feik et al. | |
| 8,939,389 B2 | 1/2015 | Rupp | |
| 9,451,850 B2 | 9/2016 | Sung | |
| 9,482,457 B2 * | 11/2016 | Sung | B02C 18/2225 |
| 10,443,917 B2 | 10/2019 | Kim | |
| 2002/0019499 A1 | 12/2002 | Ervin | |
| 2006/0043222 A1 | 3/2006 | Lee | |
| 2006/0227654 A1 | 10/2006 | Blackburn et al. | |
| 2009/0282960 A1 * | 11/2009 | Kato | F25C 5/12 83/403 |
| 2010/0231102 A1 | 9/2010 | Block et al. | |
| 2013/0233142 A1 | 9/2013 | Rupp | |
| 2014/0332612 A1 | 11/2014 | Liao et al. | |
| 2015/0069161 A1 * | 3/2015 | Liu | F25C 5/12 241/286 |
| 2015/0285547 A1 * | 10/2015 | Sung | A47J 43/25 241/95 |
| 2016/0069604 A1 * | 3/2016 | Oh | F25C 5/12 241/95 |
| 2017/0211867 A1 * | 7/2017 | Troissinger | B02C 19/20 |
| 2018/0014554 A1 | 1/2018 | Kim | |
| 2020/0003472 A1 | 1/2020 | Rupp | |
| 2020/0194999 A1 | 6/2020 | Fisher | |
| 2022/0235992 A1 | 7/2022 | Liao | |

FOREIGN PATENT DOCUMENTS

| | | | | |
|---|---|---|---|---|
| KR | 19990022548 U | * | 7/1999 | F25C 5/12 |
| KR | 20140123322 A | | 10/2014 | |
| KR | 20150095299 A | * | 8/2015 | F25C 5/12 |
| KR | 101552204 B1 | * | 9/2015 | F25C 5/12 |
| KR | 101624283 B1 | | 5/2016 | |
| TW | M46746 U | | 9/2014 | |
| WO | WO-2010004823 A1 | * | 1/2010 | F25C 5/12 |

OTHER PUBLICATIONS

International Search Report for Serial No. PCT/US22/40887 dated Dec. 29, 2022, 118 pages, United States.

* cited by examiner

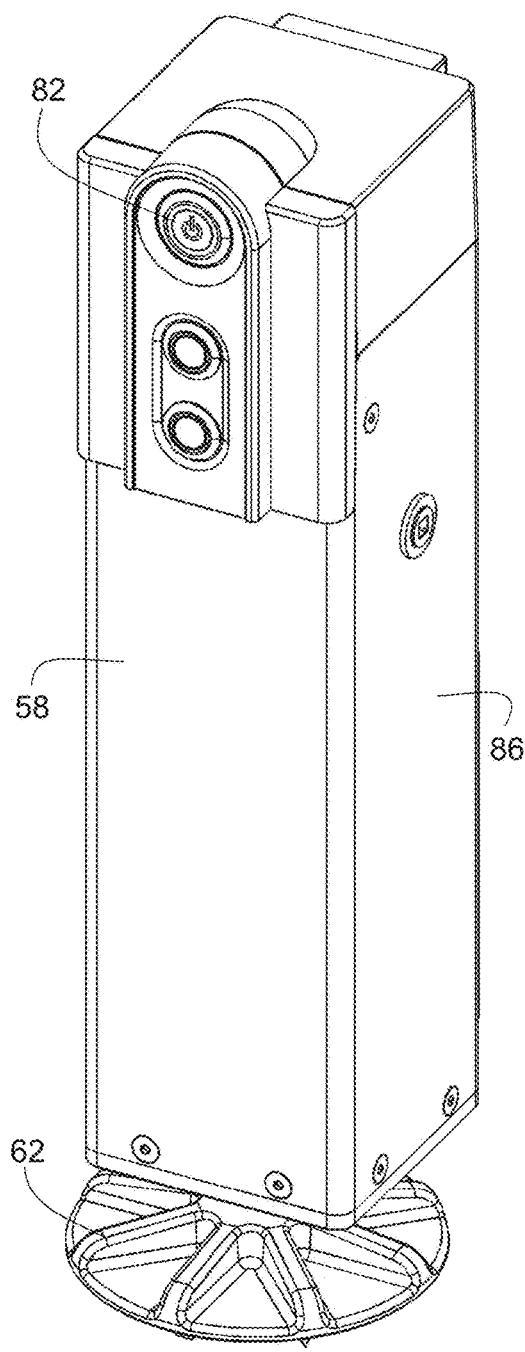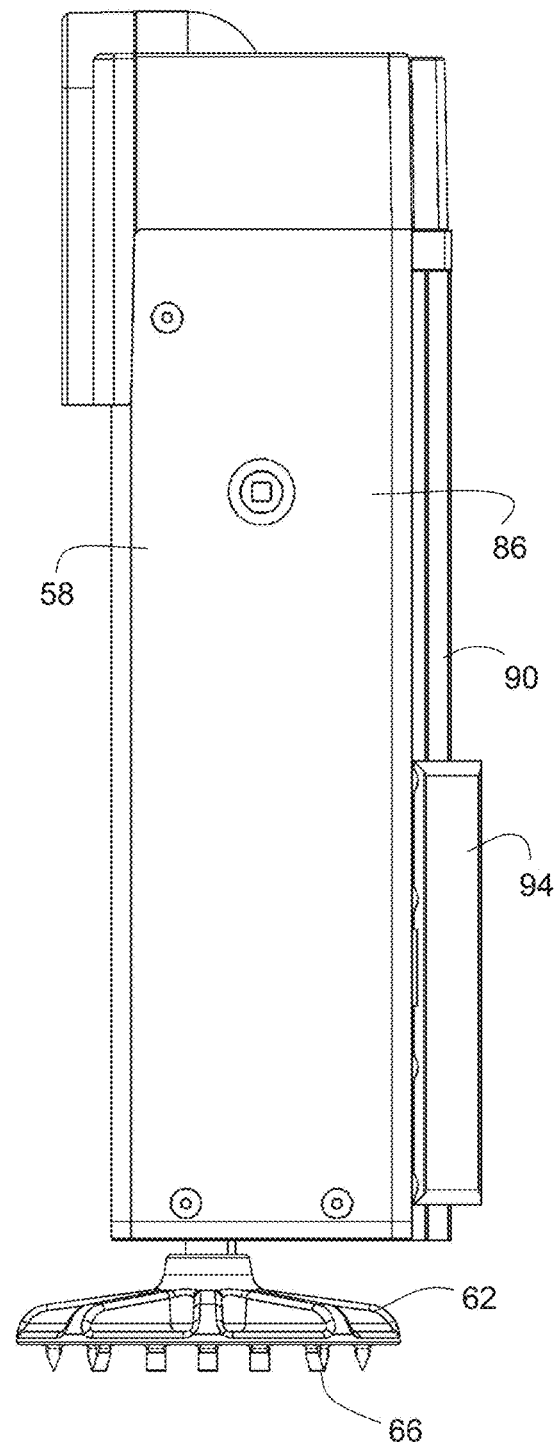
*Fig. 4*  *Fig. 5*

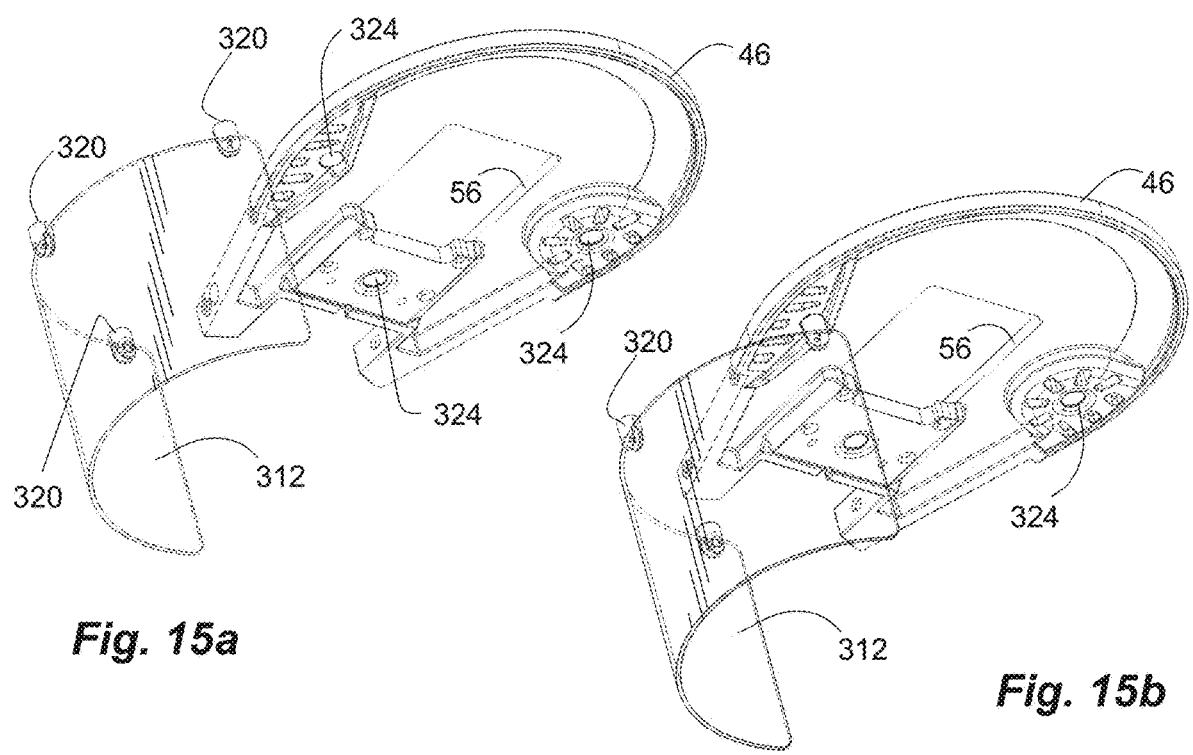
Fig. 15a
Fig. 15b
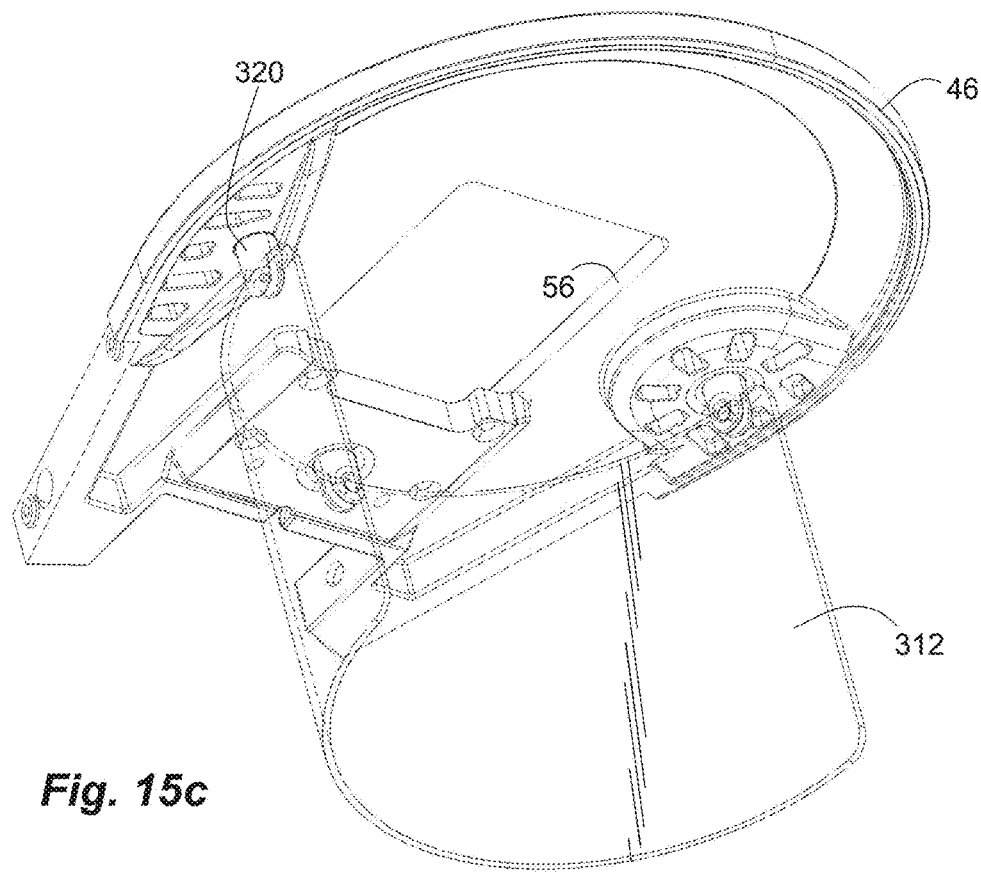
Fig. 15c

ICE SHAVER WITH IN-LINE POWER CONTROL DRIVE SYSTEM

PRIORITY CLAIM(S) AND RELATED APPLICATION(S)

This is related to U.S. patent application Ser. Nos.
Ser. No. 17/407,353, filed Aug. 20, 2021, as TNW #00635-32758.NP, entitled "Ice Shave with Multi-Link Control Arm";
Ser. No. 17/407,370, filed Aug. 20, 2021, as TNW #00635-32759.NP, entitled "Ice Shaver with Thermally Isolated Shave Deck"; and
Ser. No. 17/407,389, filed Aug. 20, 2021, as TNW #00635-32760.NP, entitled "Ice Shaver with Splash Guard"; which are hereby incorporated herein by reference.

BACKGROUND OF THE INVENTION

1. Field of the Invention

This invention relates to an ice shaver for shaving ice for shaved ice dessert.

2. Description of the Related Art

Shaved ice is an ice based dessert made from fine shavings of ice sweetened with flavored syrup and other condiments, such as cream. In one aspect, the sweetener, flavor or condiments can be added after the ice is shaved. In another aspect, the flavor can be added to the water before it is frozen and shaved.

BRIEF DESCRIPTIONS OF THE DRAWINGS

Features and advantages of the invention will be apparent from the detailed description which follows, taken in conjunction with the accompanying drawings, which together illustrate, by way of example, features of the invention; and, wherein:

FIG. 2a is a side view of the ice shaver of FIG. 1a.

FIG. 3a is a bottom perspective view of the ice shaver of FIG. 1a.

FIG. 3b is a partial bottom perspective view of the ice shaver of FIG. 1a.

FIG. 4 is a perspective view of a linear powertrain control drive system of the ice shave of FIG. 1a in accordance with an embodiment of the present invention.

FIG. 5 is a side view of the linear powertrain control drive system of FIG. 4.

FIG. 8 is a partial perspective view of the ice shaver of FIG. 1a.

Figure 1A:
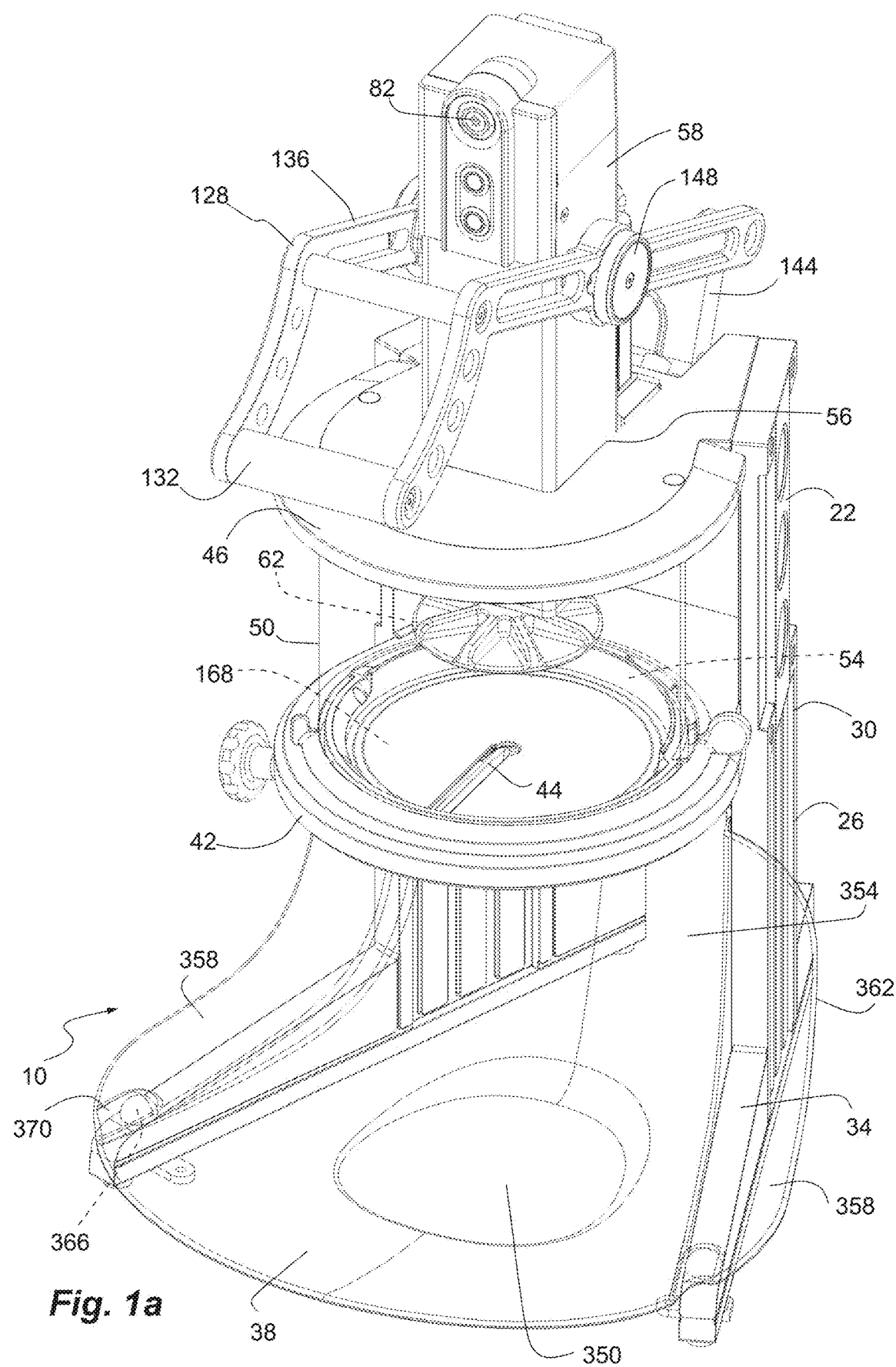
FIG. 1a is a perspective view of an ice shaver in accordance with an embodiment of the present invention.
Figure 1B:
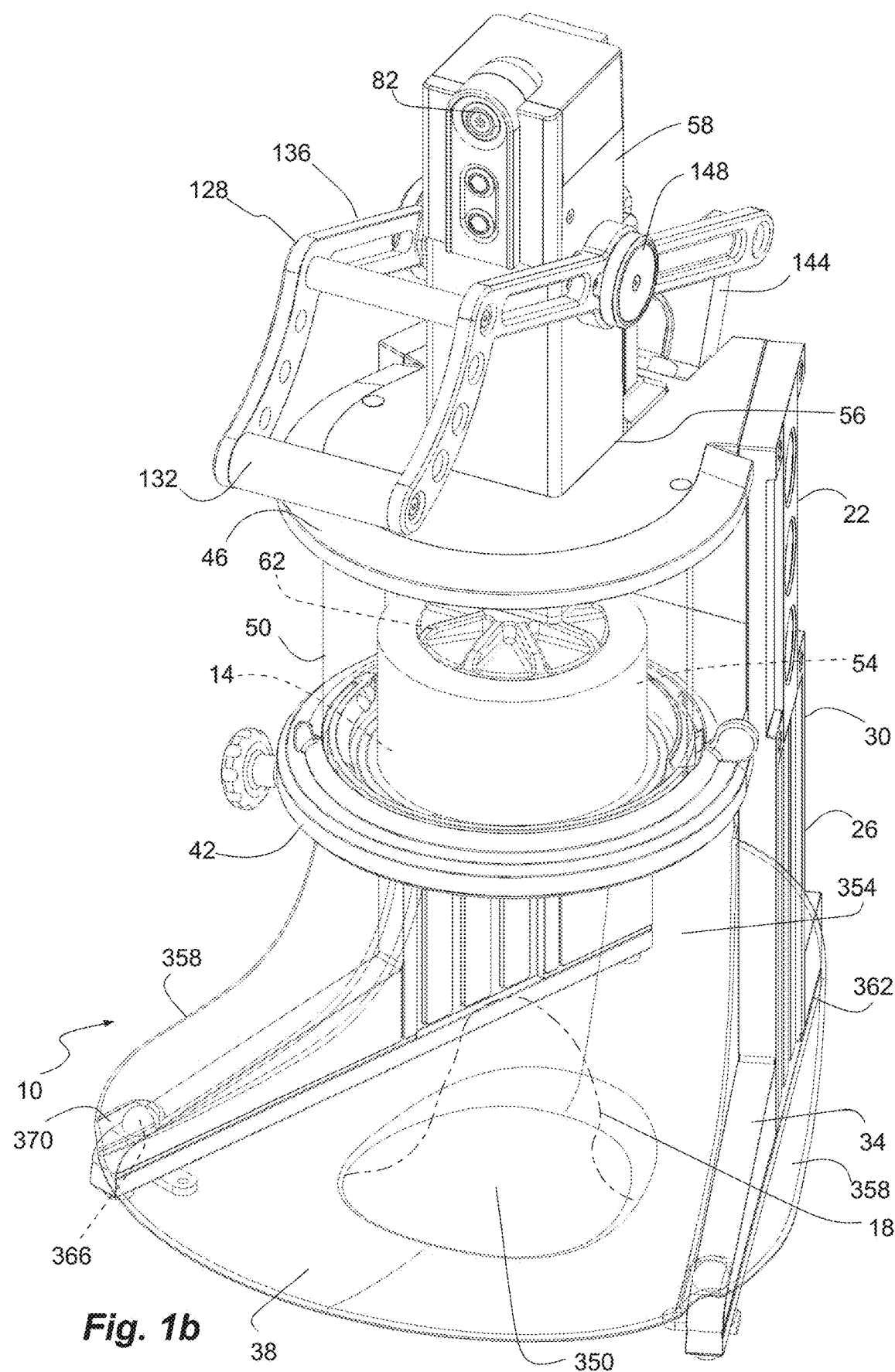
FIG. 1b is perspective view of the ice shaver of FIG. 1a, and shown with an ice block.
Figure 2A:
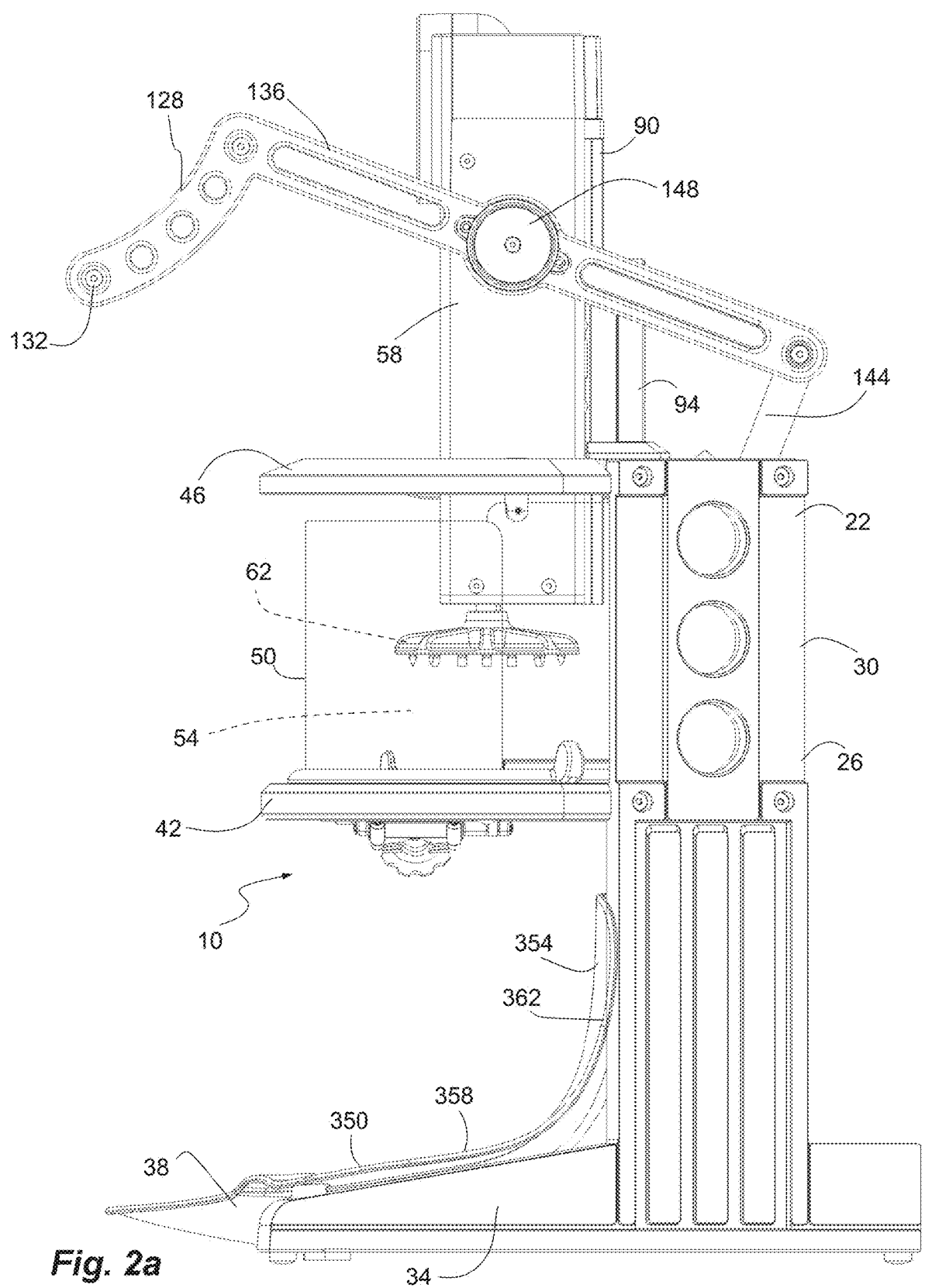
Figure 2B:
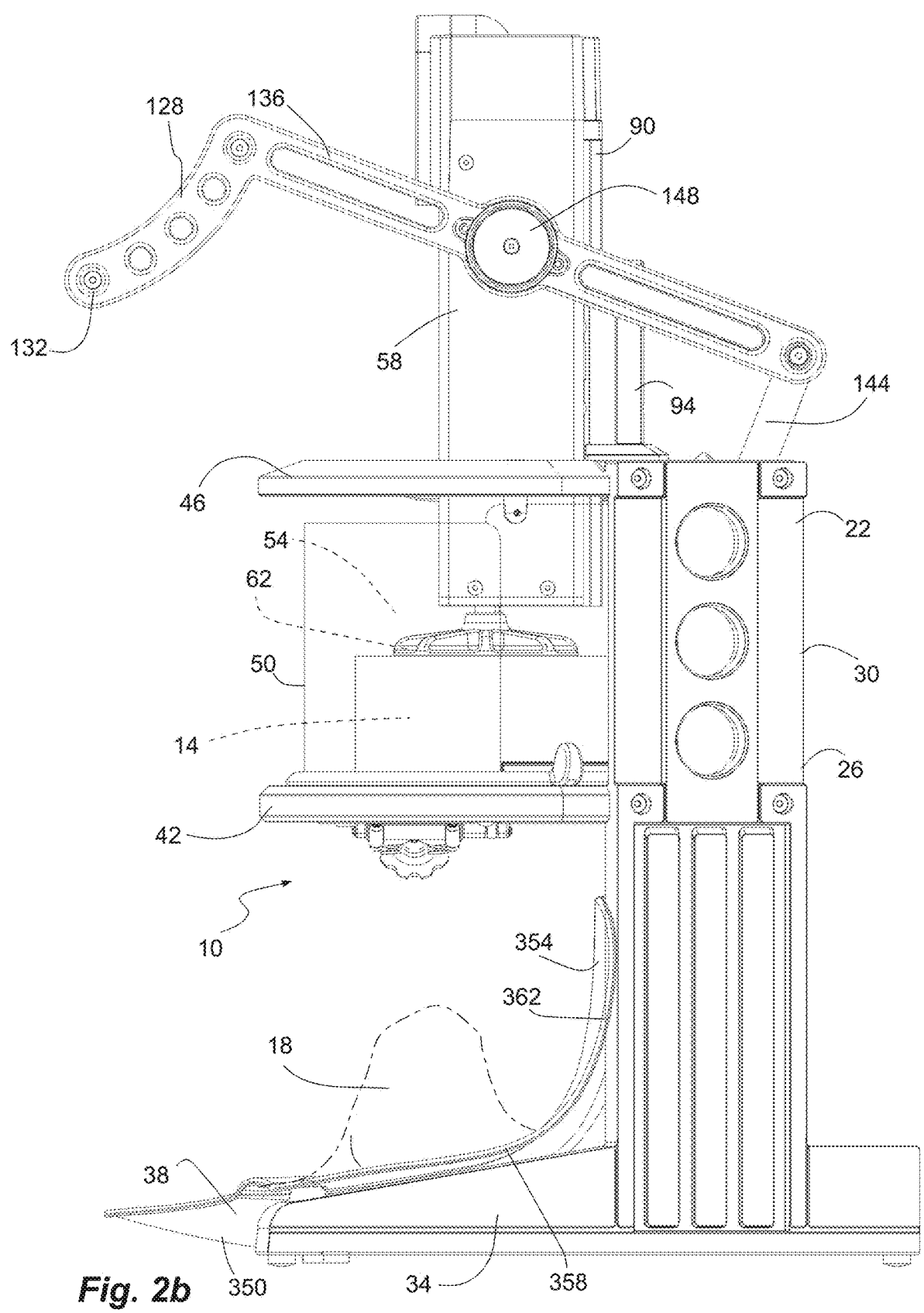
FIG. 2b is a side view of the ice shaver of FIG. 1a, and shown with the ice block.
Figure 3A:
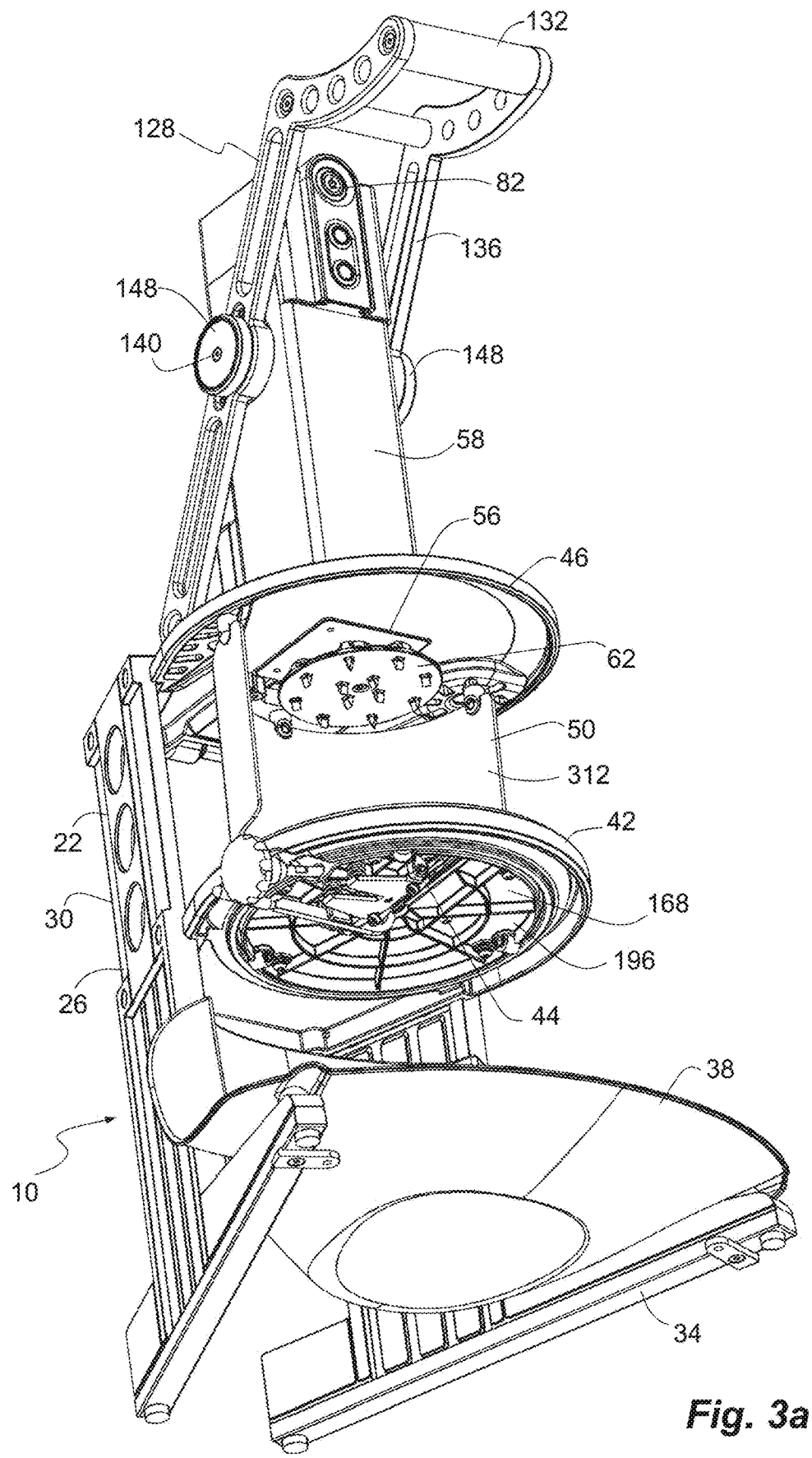
Figure 3B:
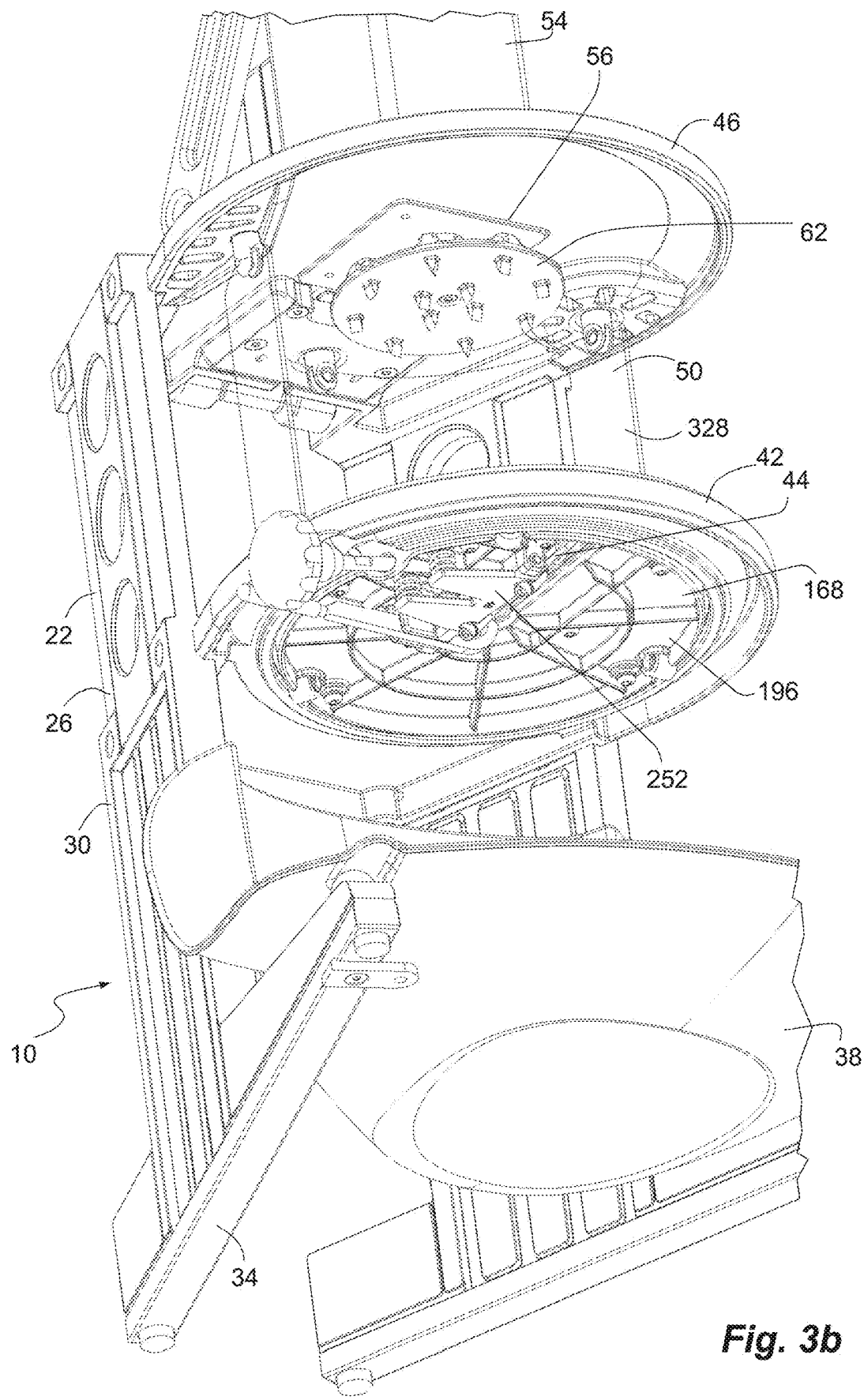
Figure 6:
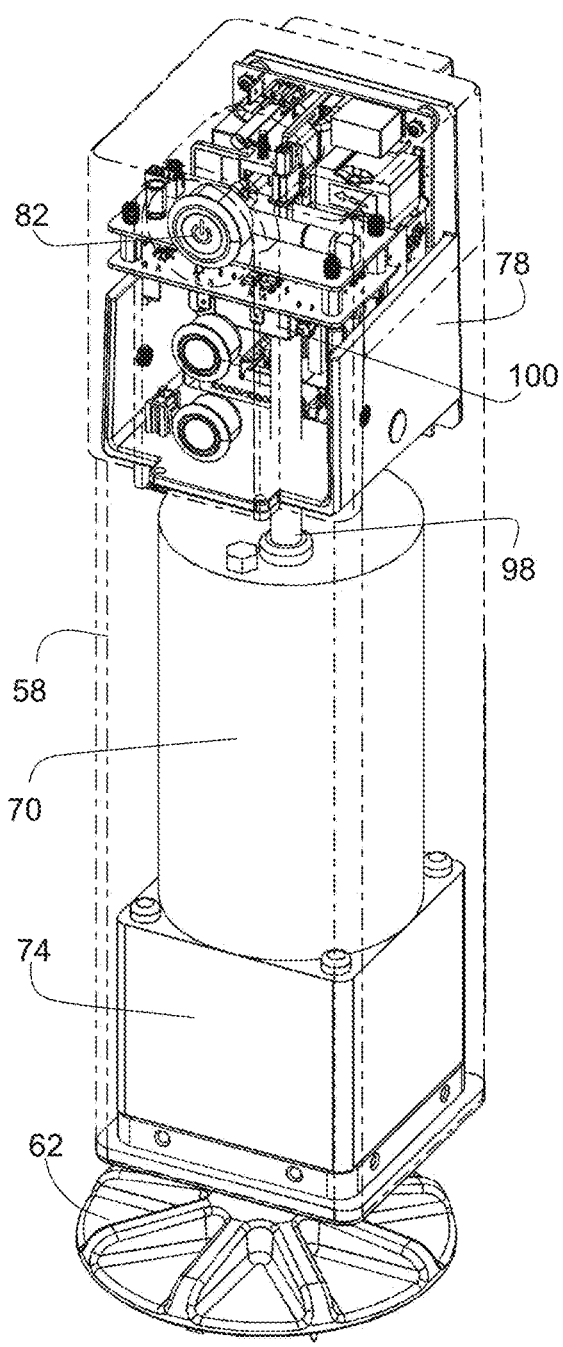
FIG. 6 is a schematic perspective view of the linear powertrain control drive system of FIG. 4.
Figure 7:
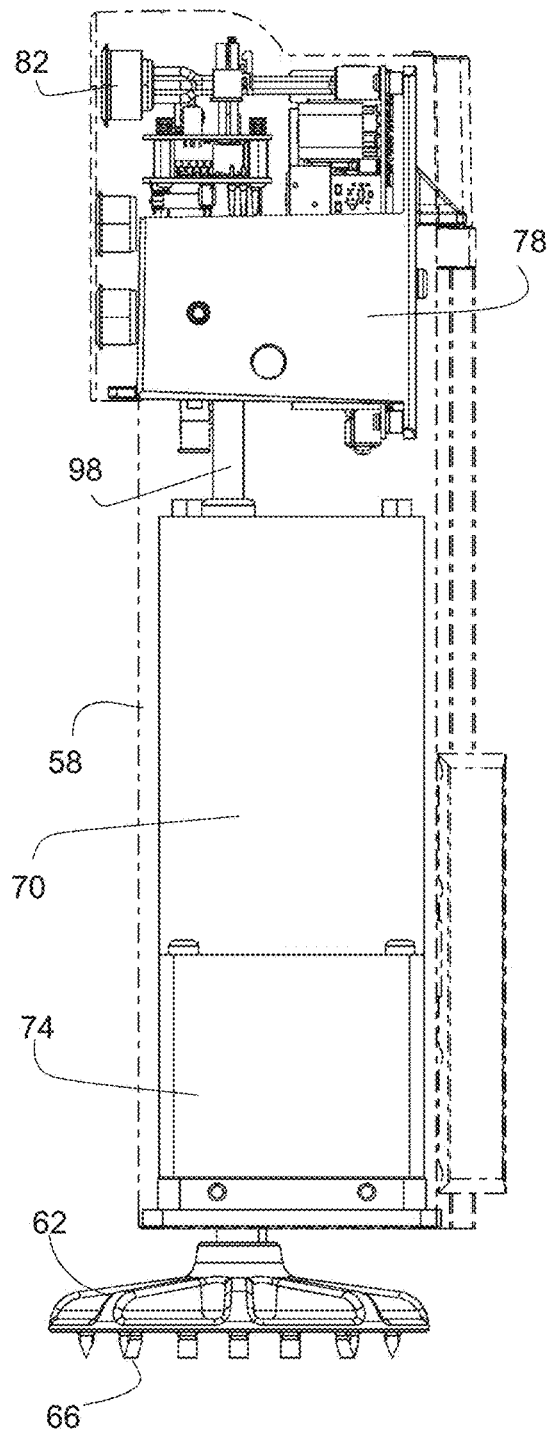
FIG. 7 is a schematic side view of the linear powertrain control drive system of FIG. 4.
Figure 8:
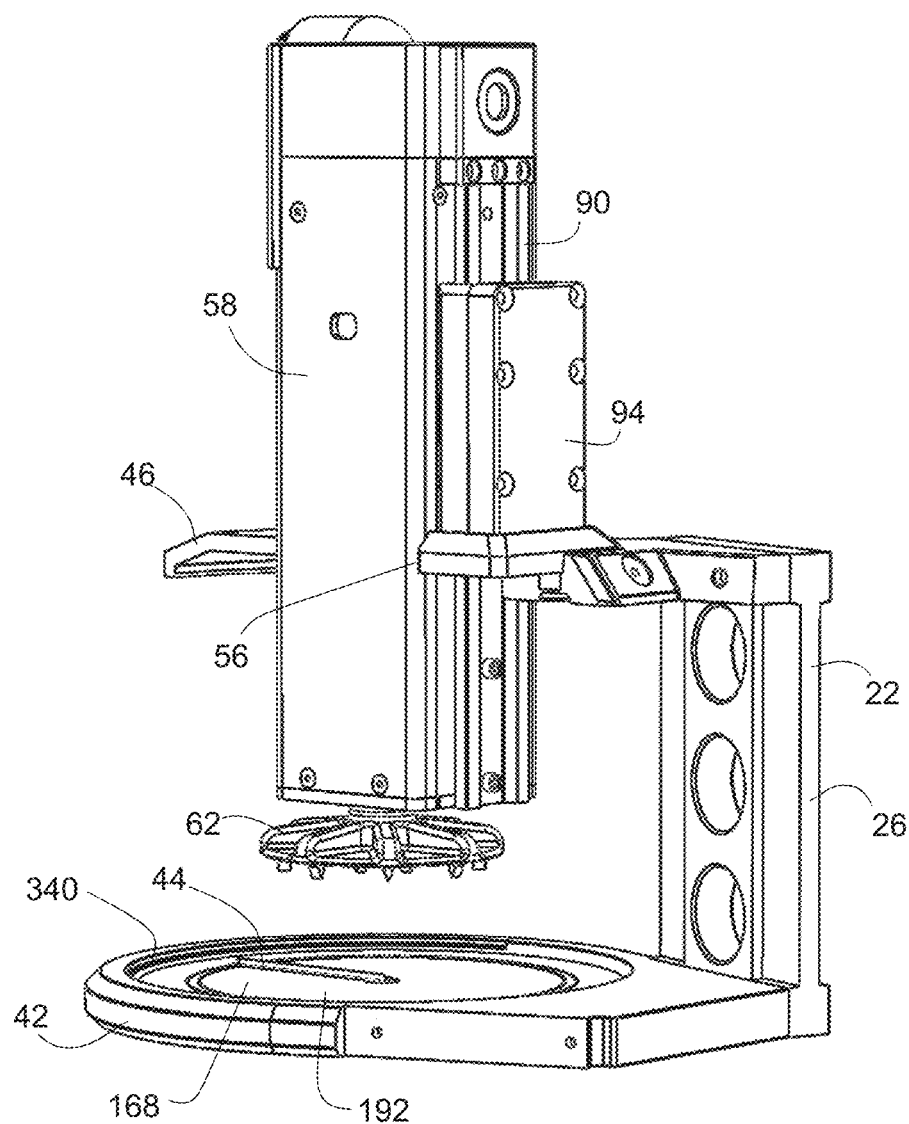
Figure 9A:
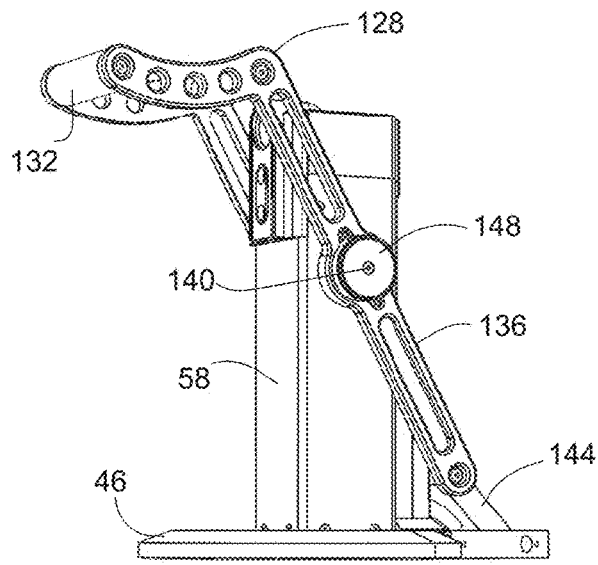
Figure 9B:
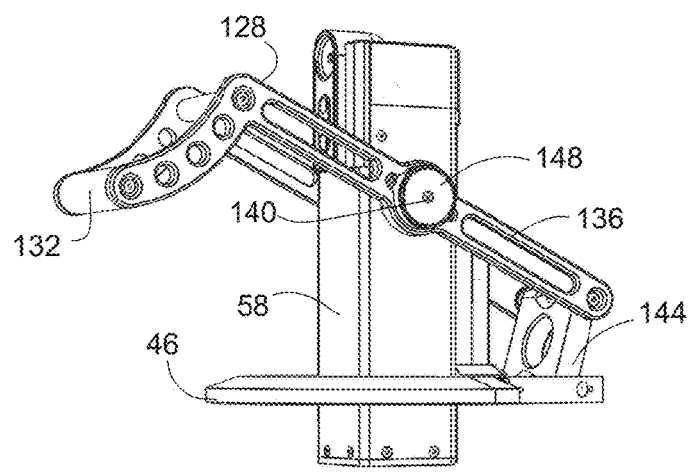
Figure 9C:
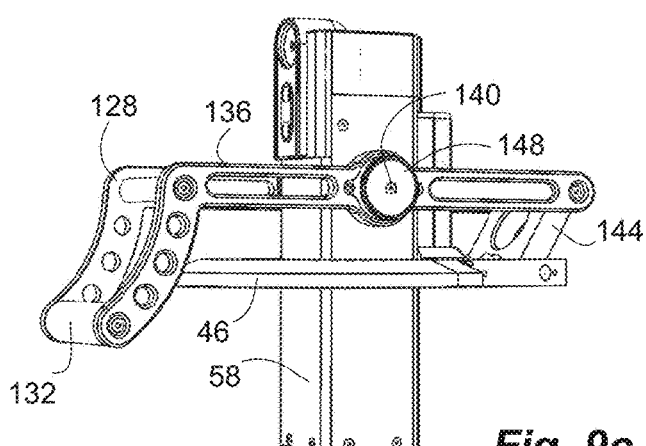

FIGS. 9a-c are schematic perspective views of a multi-link, over-center, self-locking, force-reduction motion control arm of the ice shaver of FIG. 1a showing the arm in multiple different positions and orientation, including an upper locked position as shown in FIG. 9a, an intermediate position as shown in FIG. 9b, and a lowered position as shown in FIG. 9c, in accordance with an embodiment of the present invention.

Figure 10:
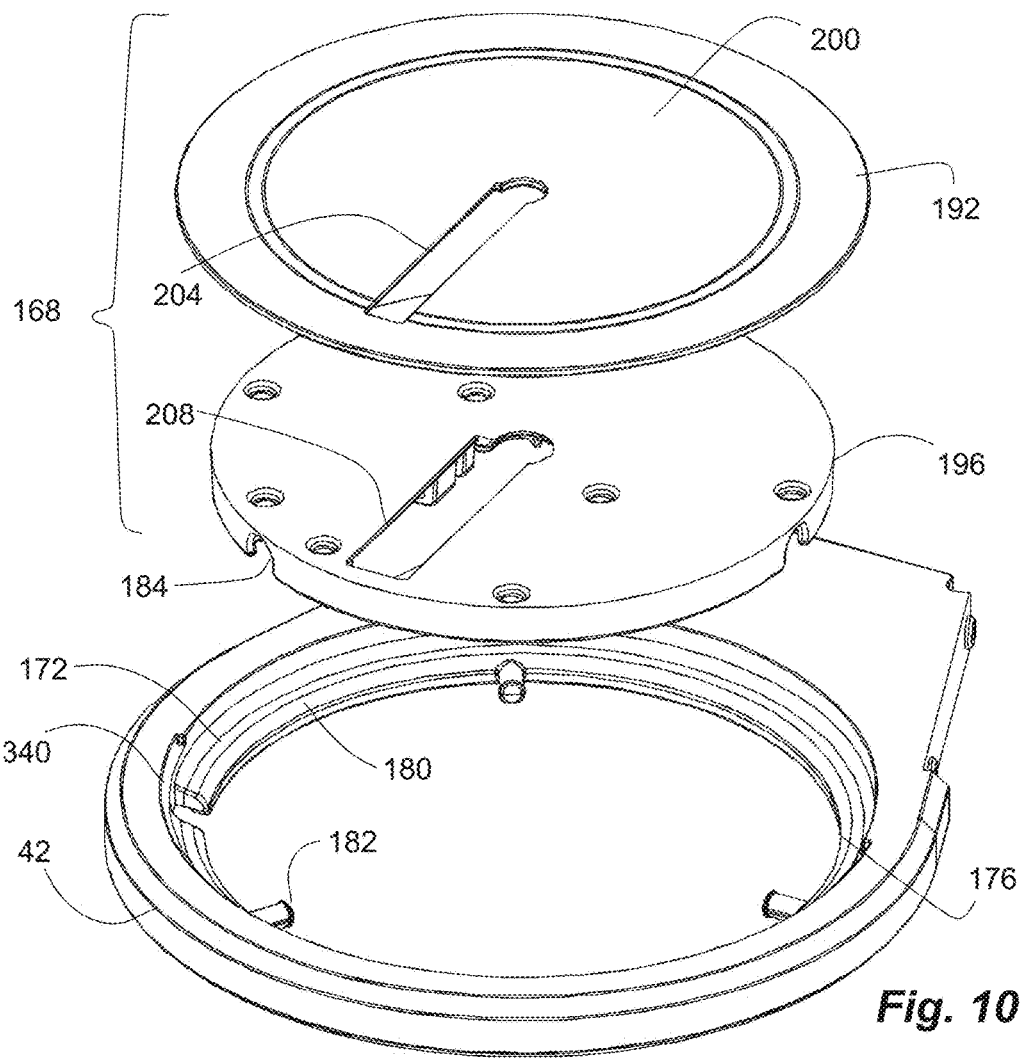

FIG. 10 is an exploded view of a modular, thermally isolated shave disc and a shave deck of the ice shaver of FIG. 1a in accordance with an embodiment of the present invention.

Figure 11:
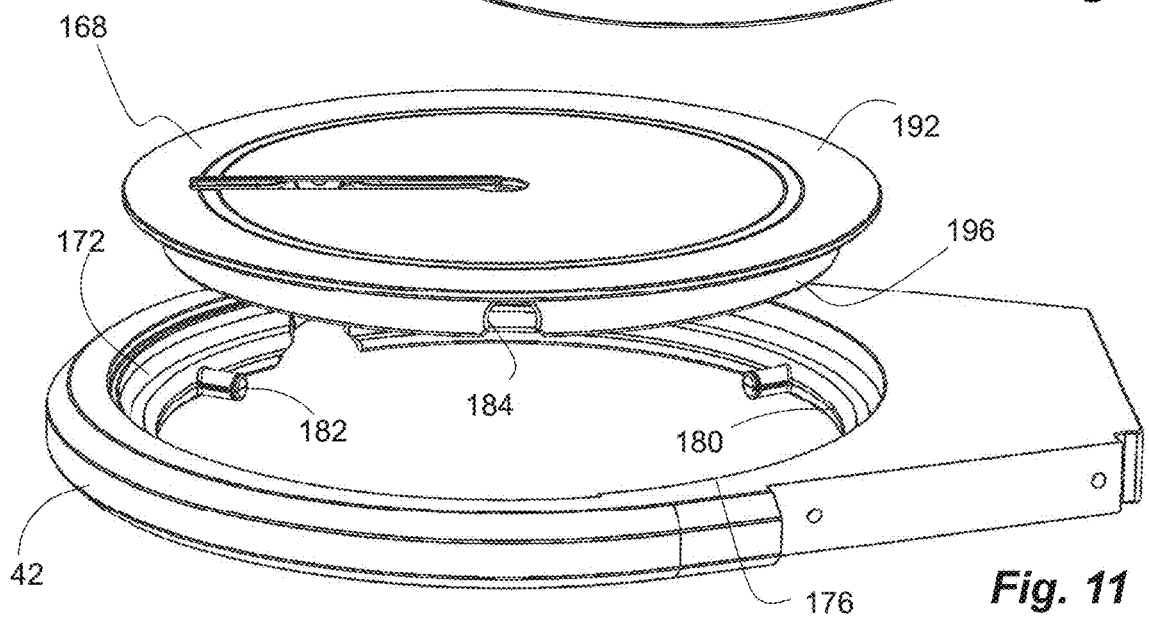

FIG. 11 is a partial perspective view of the shave deck removed from the ice shaver of FIG. 1a.

Figure 12:
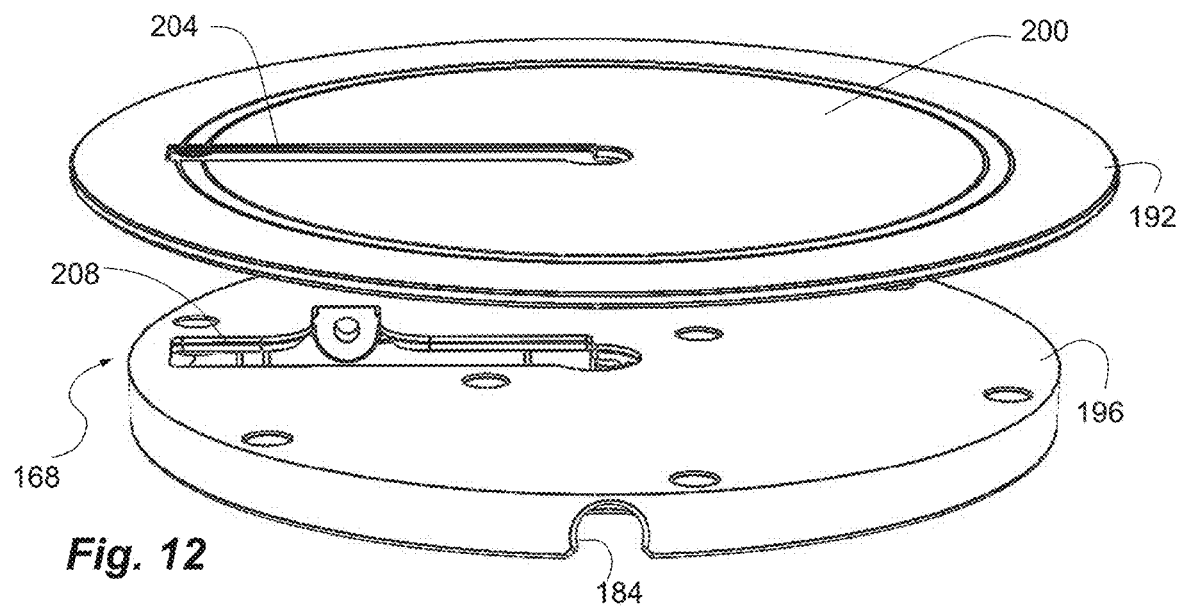

FIG. 12 is an exploded view of the shave disc of the shave deck of FIG. 10.

Figure 13:
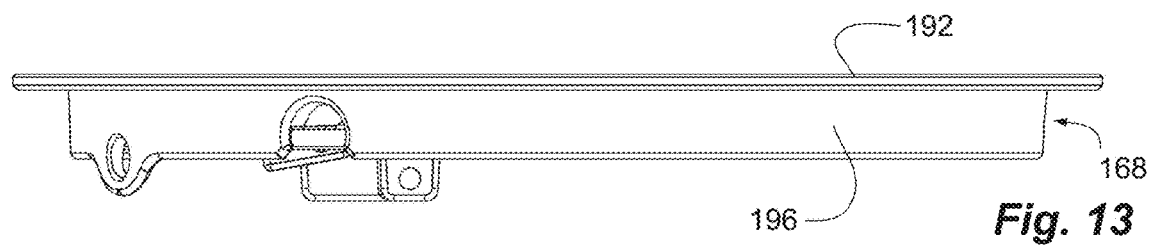

FIG. 13 is a side view of the shave deck of FIG. 10.

Figure 14:
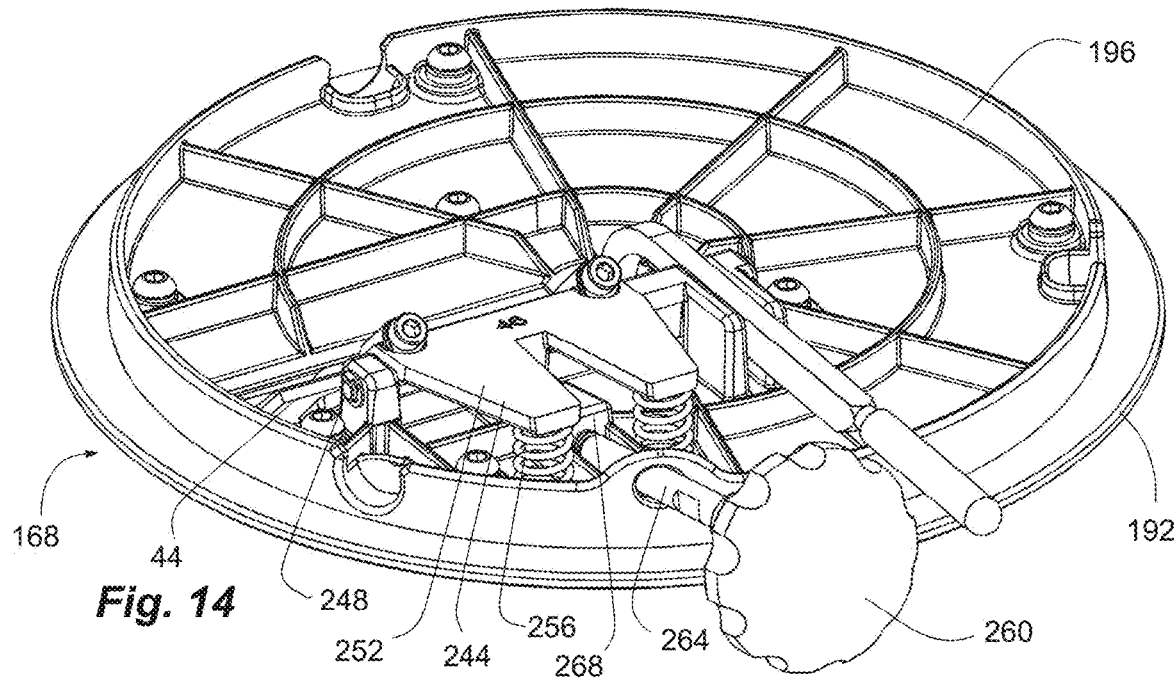

FIG. 14 is a bottom perspective view of the shave disc of the shave deck of FIG. 10.

FIG. 15a-c are schematic partial perspective views of magnetic floating splash guard of the ice shaver of FIG. 1a showing the splash guard in multiple different positions of removal and/or installation, including a removed position as shown in FIG. 15a, an installing and/or removing position as shown in FIG. 15b, and an installed position as shown in FIG. 15c, in accordance with an embodiment of the present invention.

Figure 16A:
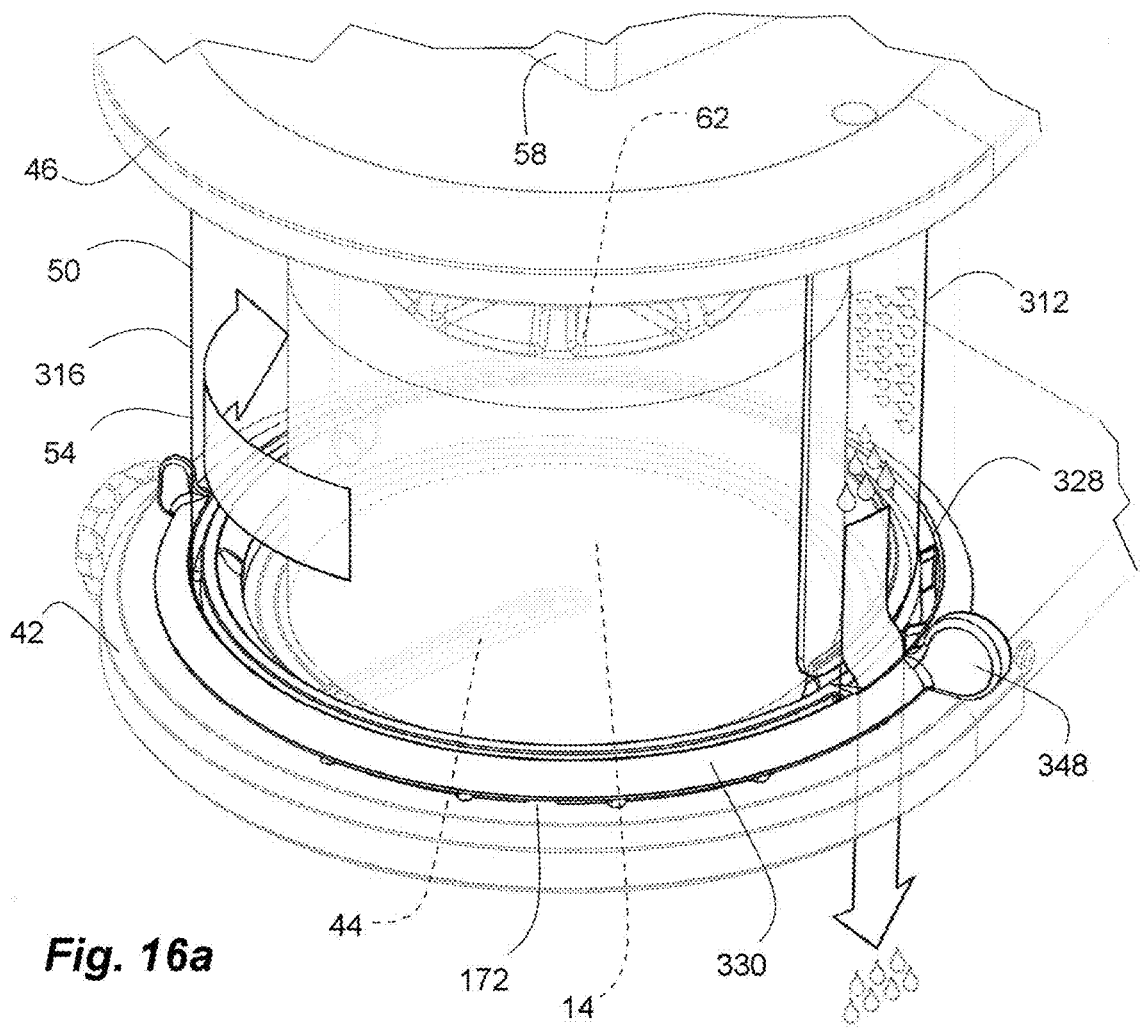
Figure 16B:
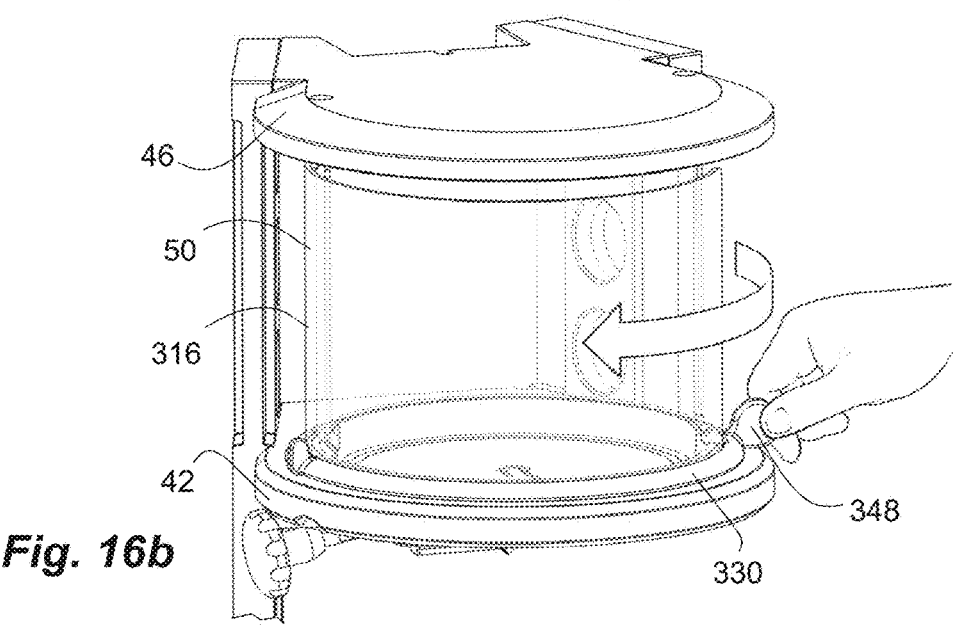
Figure 16C:
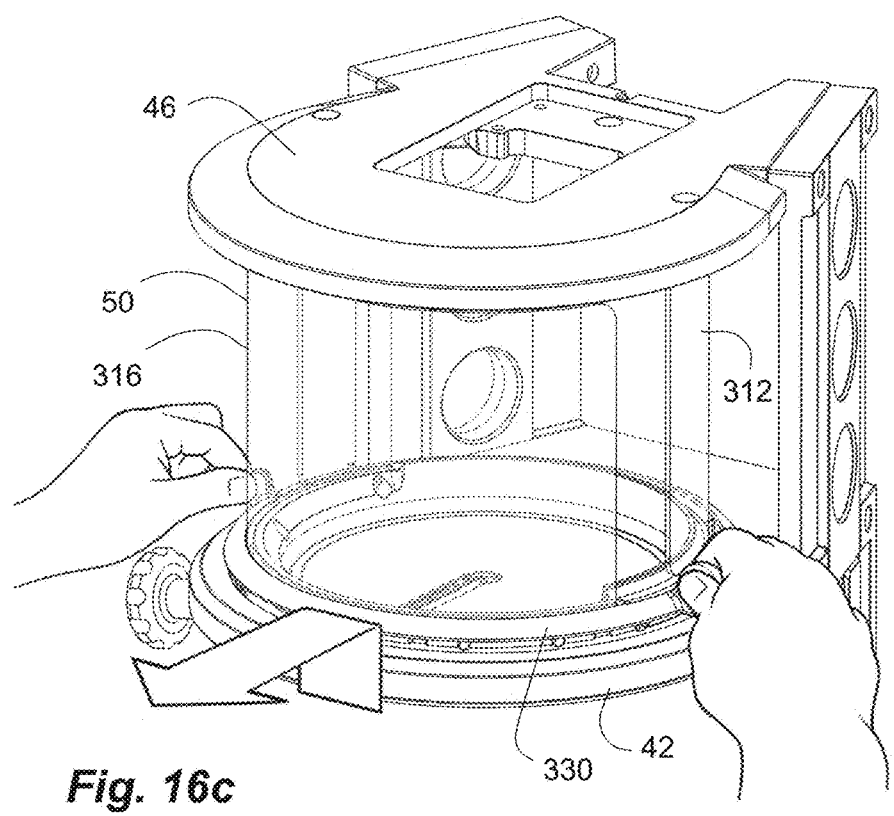
Figure 16D:
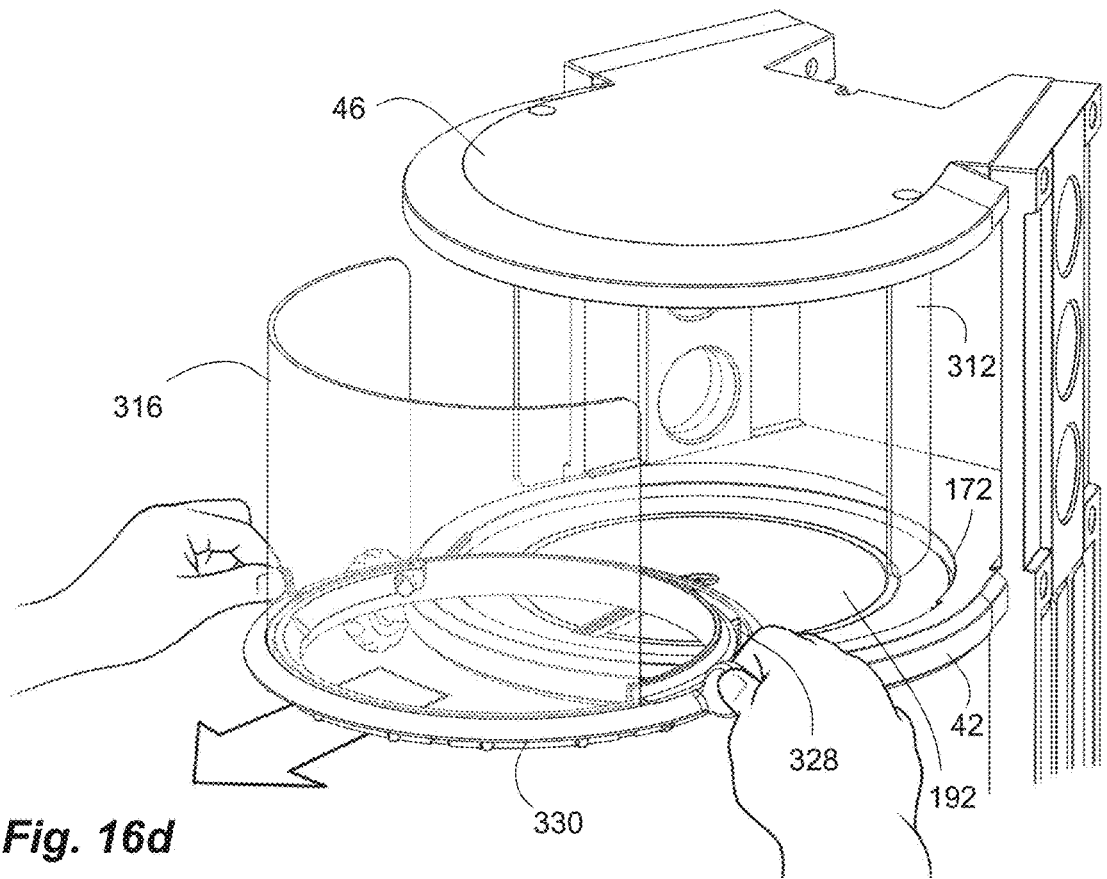

FIGS. 16a-d are schematic partial perspective views of a guard of the ice shaver of FIG. 1a in accordance with an embodiment of the present invention showing a rear splash guard and a front sliding door catching and diverting spray in FIG. 16a, sliding the front door open in FIG. 16b, lifting the front door and a shield ring in FIG. 16c, and removing the front door and the shield ring in FIG. 16d.

Figure 17:
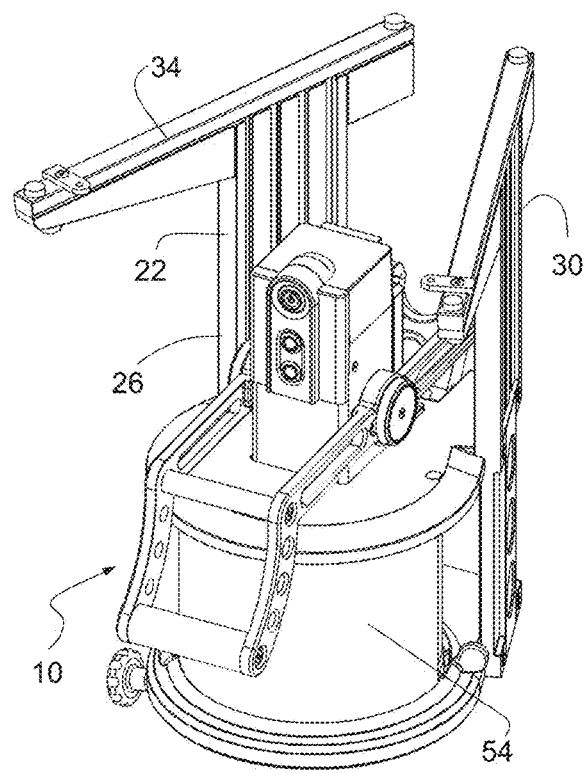

FIG. 17 is a perspective view of the ice shaver of FIG. 1a with the legs in a shipping configuration in accordance with an embodiment of the present invention.

Figure 18:
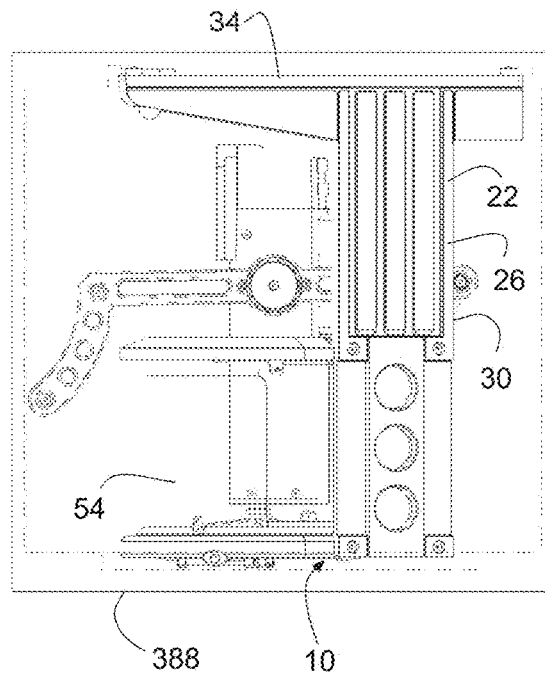

FIG. 18 is a side view of the ice shaver of FIG. 1a with the legs in a shipping configuration.

Figure 19:
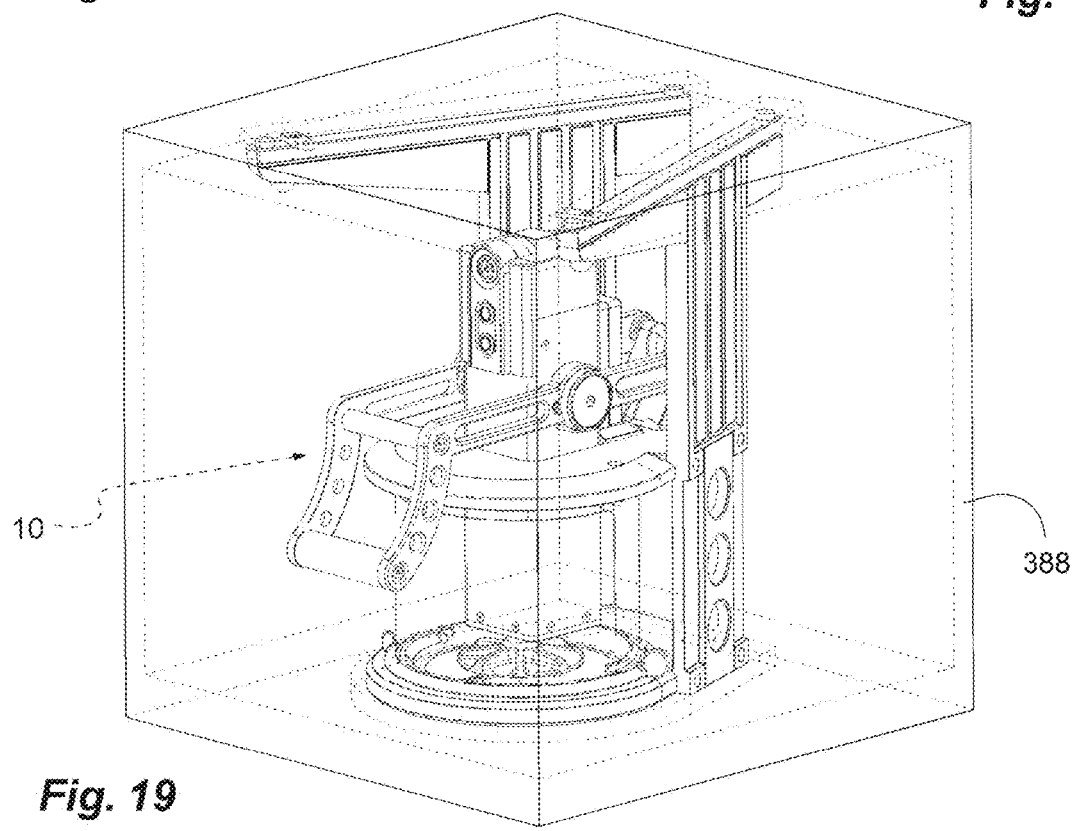

FIG. 19 is a schematic perspective view of the ice shaver of FIG. 1a with the legs in a shipping configuration and disposed in a shipping container.

Reference will now be made to the exemplary embodiments illustrated, and specific language will be used herein to describe the same. It will nevertheless be understood that no limitation of the scope of the invention is thereby intended.

DETAILED DESCRIPTION OF THE EMBODIMENTS OF THE INVENTION

Before invention embodiments are disclosed and described, it is to be understood that no limitation to the particular structures, process steps, or materials disclosed herein is intended, but also includes equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

An ice shaver machine is presented that has features to aid in the efficiency and efficacy of shaving much smaller ice shavings from a larger block of ice. The ice shaver receives the ice block and selectively rotates the ice block across a blade while pressing the ice block against the blade. The ice shavings can pass under the blade where they can be collected into a serving container and garnished with flavor, sweetener, and/or other condiments to provide a cold dessert.

In one embodiment, the ice shaver can have a power control drive system to rotate the ice block and blade with respect to one another and to press the ice block and the blade together. The power drive system can be an in-line, over-center, linear throw column. Heavier components of the drive system, such as a motor, a gear box, a transformer, etc. can be contained in a column and arranged in-line and over the center of a spike plate. The spike plate engages the ice block and is rotated by the drive system to rotate the ice block across the blade opposite the spike plate. Thus, the column can be substantially centered over the axis of rotation of the spike plate or shaft thereof. Utilizing the combined mass of the power drive system, the column can generate the necessary downward force and press linearly. The column can be displaced and pressed linearly along the rotational axis of the spike plate and shaft.

In another embodiment, the ice shaver can have a vertical-axis, gravity-induced compression apparatus. As described above, the combined mass of the heavy components, such as the motor, gearbox and transformer, can be carried by the column; and the column can be driven by gravity against the ice block to push the ice block against the blade. The column can have a vertical guide rail connected to an external carriage mount of the frame of the ice shaver.

In another embodiment, the ice shaver can have a multi-link, self-locking, force-reduction, motion control arm or armature. The armature can have a lever with a forward handle, an intermediate connection to the column, and a rear connection to the frame of the ice shaver. A link can be coupled between the rear connection of the lever and the frame of the ice shaver to form a four-bar linkage, namely the lever, the link, the frame and the column. The armature can have a raised locked configuration in which the lever and the link are oriented substantially co-linear to maintain the column and the combined mass in a raised position. In another aspect, joints between the lever and the column can comprise dampers.

In another embodiment, the ice shave can have a modular, thermally-isolated and removable shave disc that carries the blade and secures the blade relative the frame and the column. A thermally-isolated plastic assembly resists ambient temperature from being absorbed through a bottom of metal surface of the blade. The shave disc is positioned opposite the spike plate and receives the ice block thereon. The shave disc can be modular with an upper metal slip disc upon which the ice block rotates, and a lower plastic isolation pad that carries the metal disc and isolates the slip disc from the frame of the ice shaver. In another aspect, the isolation plate can carry the blade and the blade can extend therefrom through a slot in the slip disc. The shave disc, with the isolation pad, the blade and the slip disc, can be retained in a shave deck of the frame of the ice shaver and removed without tools for ease of cleaning.

In another aspect, the blade can be carried and pivoted with respect to the slip disc, and thus the ice block, by a double wishbone spring blade holder. The wishbone can be pivotally coupled under the isolation deck, and the blade can be mounted to the wishbone. A screw-driven shaft can pivot the wishbone. A pair of springs can be positioned on both sides of the shaft, and thus both sides of the wishbone, and between the wishbone and the isolation deck, to bias the wishbone and blade through the slip disc and against the ice block. The pair of springs can improve load stability and blade alignment.

In another embodiment, the ice shaver can have a 360° splash guard and shield. In one aspect, the ice shaver can have an enclosure formed by the shave deck, a top deck through which the column extends, and the guard. The guard can circumscribe the gap between the top deck and the shave deck. In one aspect, a front arcuate portion of the guard can be a door that slides open and closed around an annular track. In another aspect, another rear arcuate portion of the guard can magnetically float. In another aspect, the door can have a built-in locking detent. In another aspect, a channel can be positioned under the guard as an embedded water drainage channel positioned concentrically and underneath the rear floating magnetic splash guard to capture the water droplets spun off from the ice block and direct the water to a drainage opening in the channel. Thus, the water is kept off of the ice shavings.

Referring to FIGS. 1a-3b, an ice shaver 10 is shown in accordance with an embodiment of the invention. The ice shaver 10 can receive an ice block, indicated by 14 (FIGS. 1b and 2b), and shave ice shavings, indicated by 18, from the ice block 14 for a cold dessert. The ice shaver 10 can have a frame 22 configured to be located on a support surface, such as a countertop. The frame 22 can comprise legs 26, a shave deck, and a top deck, as described below. Each leg 26 can have a post 30 and feet 34 extending from the post 30 to form an L-shape. The feet 34 can rest on the support surface and can have compliant and resilient bumpers to form an anti-slip grip with the support surface. The legs 26 and the feet 34 can have distal ends splayed apart with respect to proximal ends attached to the posts 30 to form an acute angle in a horizontal plane parallel with the support surface. The splayed legs 26 and feet 34 can define a receiving area or drop zone for the ice shavings 18. In one aspect, the legs 26 can be formed of metal, such as aluminum, and can be formed by casting or machining. In another aspect, the legs 26 can be formed by plastic or reinforced plastic, and can be formed by injection molding. The ice shaver 10 can have a tray 38 to accumulate the ice shavings 18. The tray 38 can be positioned with a portion between the feet 34 to catch the ice shavings 18.

The ice shaver 10 can have a shave deck 42 to receive and support the ice block 14 and to carry a blade 44, as discussed below. The shave deck 42 can be carried by and connected to the legs 26, and can form part of the frame 22. The shave deck 42 can be connected at an intermediate height of the posts 30, and can extend between the legs 26. The shave deck 42 can be flat and oriented horizontally and substantially parallel with the support surface. The shave deck 42 can have distal free end with a bulbous plan view profile viewed from above, and a tapered proximal end coupled between the posts 30 of the legs 26. Thus, the distal free end of the shave deck 42 can be cantilevered over the tray 38. In one aspect, a drop zone can be defined below the shave deck 42 and above the tray 38 where the ice shavings 18 are accumulated.

The ice shaver 10 can also have a top deck 46 spaced-apart from the shave deck 42 to support a power control drive system as discussed below. The top deck 46 can be carried by and connected to the legs 26, and can form part of the frame 22. The top deck 46 can be connected at a top end of the posts 30, and can extend between the legs 26. The top deck 46 can be flat and oriented horizontally and substantially parallel with the support surface. The top deck 46 can have distal free end with a bulbous plan view profile viewed from above, and a tapered proximal end coupled between the posts 30 of the legs 26. Thus, in one aspect, the top deck 46 and the shave deck 42 can have matching plan view profiles viewed from above. The distal free end of the top deck 46 can be cantilevered over the shave deck 42. A gap can be defined between the top deck 46 and the shave deck 42. In one aspect, the shave deck 42 and the top deck 46 can be formed of metal, such as aluminum, and can be formed by casting or machining. In another aspect, the shave deck 42 and the top deck 46 can be formed by plastic or reinforced plastic, and can be formed by injection molding.

The ice shaver 10 can have a guard 50 to resist shaved ice 18 or splashing water from exiting laterally from the shave deck 42. In addition, the guard 50 can resist inadvertent contact of the ice block 14 when rotating. Furthermore, the guard 50 can resist ingress of contaminants onto the ice block 18. The guard 50 can substantially circumscribing the gap between the top deck 46 and the shave deck 42. The shave deck 42, the guard 50, the top deck 46, and a column as described below, can form and define part or most of a substantial enclosure 54 and an ice block zone to receive the ice block 18. The shave deck 42 can define and form a lower end of the enclosure 54 while the top deck 46 can define and form an upper end of the enclosure 54. In one aspect, the enclosure 54 can help thermally insulate the ice block 14 from the ambient temperature to resist melting. In one aspect, the top deck 46 and the enclosure 54 can have an opening 56 opposite the shave deck 42. In another aspect, the guard 50 can be at least translucent to view the ice block 18 therethrough. In another aspect, the guard 50 can comprise a fixed portion and a sliding portion, as described in greater detail below. In another aspect, the guard 50 can be formed of plastic and can be formed by injection molding.

Referring to FIGS. 1a-7, a power control drive system is shown to rotate the ice block 18 and the blade 44 with respect to one another and to press the ice block 18 and the blade 44 together against one another. The power drive system can be or can comprise an in-line, over-center, linear throw column 58 carrying and driving a spike plate 62. The spike plate 62 can be located in the enclosure 54 opposite the shave deck 42. The spike plate 62 can be movable towards the shave deck 42 and the blade 44, and rotatable with respect to the shave deck 42 and the blade 44. The spike plate 62 can have a matrix of spikes 66 to engage the ice block 14 so that rotation of the spike plate 62 is imparted to the ice block 14; thus, rotating the ice block 14 with respect to the shave deck 42 and the blade 44.

The column 58 can extend through the opening 56 of the top deck 46 and the enclosure 54. In one aspect, the column 58 can close the opening 56 and form and define the enclosure 54. Thus, the column 58 can have a perimeter size and shape that matches a perimeter size and shape of the opening 56. In one aspect, the opening 56 and the column 58 can have a non-circular shape, such as substantially or majority square, to resist rotation of the column 58 with respect to the top deck 46, the shave deck 42 and the frame 22. In addition, the column 58 can carry the spike plate 62 and move in the opening 56, and into and out of the enclosure 54, to advance and retract the spike plate 62 with respect to the shave deck 42 and the blade 44. In one aspect, the column 58 and the spike plate 62 can move linearly towards and away from the shave deck 42 and the blade 44. The column 58 can be a ram for driving the spike plate 62 and the ice block 14.

As discussed above, the column 58 can carry and contain heavier components of the power control drive system, such as a motor 70, a gear box 74 and a power supply 78, such as a transformer. In addition, the column 58 can also carry a motor control switch 82. The column 58 can have a lateral perimeter side wall 86 that circumscribes a lateral perimeter of the column 58. In one aspect, the side wall 86 can be solid and continuous along substantially an entire height of the column 58. In another aspect, the column 58 can have a constant longitudinal cross-sectional size and shape. Thus, the side wall 86 can oppose the top deck 46 surrounding the opening 56 to maintain the substantial enclosure 54. In another aspect, the column 58 can form or can define an elongated tube.

The motor 70 can be carried by and contained within the column 58. In one aspect, the motor 70 can have a lateral dimension filling an internal lateral dimension of the column 58. Thus, the space within the column 58 can be used efficiently. The motor 70 is coupled, through the gear box 74, to the spike plate 62. The motor 70 rotates the spike plate 62 with respect to the shave deck 42 and the blade 44. The motor 70 moves with the column 58 towards and away from the shave deck 42 and the blade 44.

In one aspect, the column 58 can be carried by the top deck 46 and the frame 22. In another aspect, the column 58 can translate up and down, and towards and away from the shave deck 42 and the blade 44. The column 58 can be movably carried by a rail and carriage. The rail 90 can be mounted to the column 58 and can extend longitudinally along the column 58. The carriage 94 can be mounted to the top deck 46, the frame 22 and the enclosure 54. The carriage 94 can movably receive the rail 90. The rail 90 and the carriage 94 can direct the column 58 to linear movement through the opening 56 in the top deck 46.

The power supply 78 can be carried by and contained within the column 58. The power supply 78 can comprise an electrical transformer coupled to an external power source. In one aspect, the power supply 78 can also comprise a controller or control electronics. A feedback shaft 98 can extend from the motor 70 and can be electrically coupled to the power supply 78. Thus, the power supply 78 can have a sensor 100 to sense rotation of the feedback shaft 98 and performance of the motor 70. The power supply 78 can be located above the motor 70 in the column 58, and can be positioned at a top of the column 58.

The motor control switch 82 can be carried by the column 58 and can be electrically coupled to the power supply 78. In one aspect, the control switch 82 can comprise a power switch to activate the motor 70. In another aspect, motor control switch 82 can comprise motor speed control to activate a rotational speed of the motor 70. In another aspect, the control switch 82 can move with the column 58.

The gear box 74 can be carried by and contained within the column 58. The gear box 74 is coupled between an output shaft of the motor 70 and the spike plate 62. The gear box 74 can reduce the output speed of the motor 70 and increase the torque. In one aspect, the gear box 74 can be positioned below the motor 70 and can be located at a bottom of the column 58. In another aspect, the bear box 74 can close a bottom of the column 58 and the tube.

As described above, the combined weight of the column 58, the motor 70, the gearbox 74, the power supply 78, and the spike plate 62 can together bear against the ice block 14 and push the ice block 14 against the shave deck 42 and the blade 44. Thus, the ice shaver 10 utilizes the force of gravity and the weight of the column 58, the motor 70, the gearbox 74, the power supply 78 and the spike plate 62. In another aspect, the column 58 and the spike plate 62 can also be driven by additional force, such as manually driven.

Referring to FIGS. 1a-3a and 9a-c, the ice shaver 10 can also have a multi-link, over-center, self-locking, force-reduction, motion control arm or armature 128 to manually control motion of column 58 and the spike plate 62, and to further drive the spike plate 62 against the ice block 14, and the ice block 14 against the blade 44. The armature 128 can be coupled to the top deck 46 and the frame 22, and to the column 58. The armature 128 can comprise a handle 132 coupled to the column 58 and positioned forward of the column 58 and the frame 22 and the top deck 46. In addition, the handle 132 can be oriented horizontally. Thus, the handle 132 can be griped to drive the column 58 and the spike plate 62 downwardly, and to drive the ice block 14 against the blade 44, along with the gravitational force.

In addition, the armature 128 can have a lever 136 coupling the handle 132 to the column 58 and the frame 22. The lever 136 can amplify the force provided at the handle 132 to provide a greater driving force against the ice block 14. A proximal end of the lever 136 is coupled to the handle 132 and a distal end is coupled to the frame 22, the top deck 46 and the enclosure 54 via a link. An intermediate portion of the lever 136 is coupled to the column 58 at a joint 140. The joint 140 can define an integrated fulcrum of the lever 136. Thus, lifting or raising the handle 132 raises the column 58 and the spike plate 62, while lowering and pressing the handle 132 lowers the column 58 and the spike plate 62, and drives the ice block 14 against the blade 44.

Furthermore, the armature 128 can have a link 144 coupled between the distal end of the lever 136 and the frame 22, the top deck 46 and the enclosure 54. Thus, a four-bar linkage is formed by the lever 136, the link 144, the column 58 and the top deck 46. The armature 128 has at least two configurations, including a lowered configuration and a raised and locked configuration. In lowered configuration, the column 58 and the spike plate 62 are lowered, and the lever 136 and the link 144 are oriented transvers to one another, as shown in FIG. 9c. In the raised and locked configuration, the column 58 and the spike plate 62 are raised, and the lever 136 and the link 144 are oriented substantially co-linear, essentially locking the column 58 in the raised position, as shown in FIG. 9a. In one aspect, the lever 136 can comprising a pair of levers with the column 58, the handle 132 and the link 144 positioned between the pair of levers. Similarly, the joint 140 can comprise a pair of joints between the intermediate portions of the levers 136 and the column 58. In another aspect, the lever 136 can be angled to lower a position of the handle 132 for ease of use.

In one aspect, a damper 148 can be coupled between the column 58 and the lever 136 at the joint 140. The damper 148 can resist pivotal motion of the joint 140, and thus can resist sudden downward thrust. The damper 148 resists sudden movement of the column 58 and the spike plate 62 from potential injuring an operator's hand. In one aspect, the damper 148 can resist downward motion and lowering of the column 58. In another aspect, the damper 148 can be a pair of dampers coupled between the column 58 and the pair of levers 136 at the pair of joints 148. In another aspect, one of the pair of dampers 148 can damp and resist downward motion of the column 58, while the other of the pair of dampers 148 can damp and resist upward motion of the column 58. Thus, the pair of dampers 148 can be symmetrical dampers resisting motion of the column both up and down. In one aspect, the damper 148 can be a rotary damper. In another aspect, the damper can comprise a chamber filled with a viscous fluid providing damping resistance to vanes passing through the viscous fluid. The chamber can be fixed with respect to one of the column 58 or the lever 136, while a shaft with the vanes is fixed with respect to the other of the column or the lever.

Referring to FIGS. 10-14, the ice shaver 10 can have a two-piece, modular, thermally-isolated and tool-less removable shave disc 168. The shave disc 168 can carry the blade 44, and can secure the blade 44 relative to the frame 22 and the column 58. The shave disc 168 can be carried by the shave deck 42 and the frame 22. The shave disc 168 is positioned opposite the spike plate 62 and receives the ice block 14. Thus, the ice block 14 is pressed against and rotated on the shave disc 168 by the column 58 and the spike plate 62. In one aspect, the shave disc 168 can form and define the substantial enclosure 54 along with the shave deck 42. In one aspect, the shave disc 168 can be vertically positionable on the shave deck 42 and can be vertically removable from the shave deck 42. Thus, the shave disc 168 can be maintained on the shave deck 42 by the force of gravity, and/or by force exerted by the spike plate 62 and the column 58, and/or both. In one aspect, the shave disc 168 can rest on the shave deck 42 and be maintained thereon without any fasteners requiring tools. Thus, the shave disc 168 can be easily and quickly removed and replaced for cleaning, adjustment of the blade 44, etc.

In one aspect, the shave deck 42 can have a receptacle 172 facing towards the spike plate 62 and the top deck 46. An aperture 176 can extend through the shave deck 42 and the receptacle 172. The receptacle 172 can circumscribe the aperture 176. The aperture 176 can allow ice shavings 18 to pass through the shave deck 42. The receptacle 172 can have an annular lip 180 protruding around an inside perimeter of the aperture 176. The annular lip 180 can be positioned below an upper surface of the shave deck 42 forming a stepped recess in the receptacle 172. The shave disc 168 can be received in the receptacle 172 and can substantially close the aperture 176 in the shave deck 42. In one aspect, tabs 182 can extend radially inward from the annular lip 180 and the receptacle 172 of the shave deck 42. The tabs 182 can be rods. Notches 184 can be formed in the shave disc 168 (such as the isolation pad 196 described below) and can receive the tabs 182. The notches 184 can have lower openings to receive the tabs 182. The tabs 182 in the notches 184 can rotationally lock the shave disc 168 to the shave deck 42 without tools. Thus, the shave disc 168 can be vertically positionable on the shave deck 42 and vertically removable from the shave deck 42 with the notches 184 vertically engaging the tabs 182.

The shave disc 168 can comprise a slip disc 192 carried by an isolation pad 196. The slip disc 192 and the isolation pad 196 can have a round or circular shape in planter view from above. The slip disc 192 can be recessed in the receptacle 172 of the shave deck 42 and can reside in the stepped recess. The isolation pad 196 can be at least partially received within the aperture 176 of the shave deck 42 and can reside inside the annular lip 180.

The slip disc 192 has an upper surface 200 upon which the ice block 14 can slide as it rotates. In addition, the slip disc 192 can have a radial slot 204 extending through the disc 192 and extending radially from near the center to near the perimeter. The blade 44 can extend through the slot 204. Thus, as the ice block 14 rotates on the upper surface 200 of the slip disc 192, the blade 44 can cut and shave the ice shavings 18 from the ice block 14. The ice shavings 18 can pass through the slot 204.

The isolation pad 196 carries the slip disc 192, and can be coupled to the shave deck 42. Thus, the slip disc 192 is coupled to the shave deck 42 by the isolation pad 196. The slip disc 192 can be attached directly to the isolation pad 196 by fasteners. The isolation pad 196 can also have a radial slot 208 extending through the isolation pad 196 and corresponding to and aligned with the slot 204 of the slip disc 192. Thus, the ice shavings 18 can pass through the slot 208 of the isolation pad 196 as well.

In one aspect, the slip disc 192 can be formed from metal, such as stainless steel, and can be formed by stamping from sheet stock. In another aspect, the isolation pad 196 can be formed of plastic, and can be formed by injection molding. In another aspect, the slip disc 192, or the material of the slip disc, can have a greater thermal conductivity than the isolation pad 196, or the material of the isolation pad. In another aspect, the frame 22 and the shave deck 42 can be formed of a material, such as aluminum, with a greater thermal conductivity. Thus, the isolation pad 196 can separate the slip disc 192 from the frame 22 or the shave deck 42, such that neither touch. In addition, the isolation pad 196 can be thicker than the slip disc 192. In another aspect, the slip disc 192 can be spaced-apart from isolation pad 196 by an air gap. In another aspect, posts can extend between the slip disc 192 and the isolation pad 196 to elevate the slip disc 192 above the isolation pad 196. Thus, the isolation pad 196 can thermally isolate the slip disc 192, and thus the ice block 14, from the shave deck 42 and the frame 22 to resist and slow melting of the ice block 14.

As described above, the ice block 14 can be cut by a blade 44 into ice shavings 18. The blade 44 can be carried by the shave disc 168, such as the isolation pad 196, and can extend through the slot 208 in the isolation pad 196 and the slot 104 in the slip disc 192. The column 58 and the spike plate 62 press and rotate the ice block 14 against the blade 44.

Referring to FIG. 14, the ice shaver 10 can have a double spring wishbone blade holder. A wishbone 244 can be carried by isolation pad 196 and the shave disc 168. The wishbone 244 can be positioned below the slip disc 192 and the isolation pad 196. The blade 44 can be mounted to and carried by the wishbone 244, and can extend from the wishbone 244 through the 208 in the isolation pad 196 and the slot 204 in the slip disc 192. The wishbone 244 can have an axle 248 pivotally coupled to the underside of the isolation pad 196. In one aspect, a pair of mounts can extend from below the slip disc 192 to carry the axle 248 with the wishbone 244 thereon. Thus, the wishbone 244, and thus the blade 44, can be pivotal with respect to the slip disc 192 and the isolation pad 196. The wishbone 244 can have a pair of wings 252 extending therefrom near the axle 248. A pair of springs 256 can be positioned between the underside of the isolation pad 196, and the slid disc 192, and the pair of wings 252 of the wishbone 244. Thus, the springs 256 can be positioned on both sides of the wishbone 244 and the blade 44. The springs 256 can bias the wishbone 244 and the blade 44 through the slots 204 and 208 and against the ice block 14. The pair of springs 256 on opposite sides of the wishbone 244, and opposite sides of the blade 44, can provide a more even bias force distributed across a width of the blade 44. A knob 260 can pivot a threaded rod 264 to advance and retrace a wedge-shaped limit block 268 to limit the extension of the blade 44. The threaded rod 264 and the limit block 268 can be positioned between the pair of springs 256, and can be centered with respect to the wishbone 244 and the blade 44. The centered position of the threaded rod 264 and the limit block 268, and the use of a pair of springs on opposite sides thereof, provides a more balanced tension and bias force.

As described above, the ice block 14 can be placed in the substantial enclosure 54 of the ice shaver 10. The guard 50 can selectively surround a perimeter of the enclosure 54. Referring to FIGS. 15a-16d, the guard 50 can have a pair of arcuate portions that together circumscribe the enclosure 54, such as a rear stationary splash guard or shield 312 and a front shield or door 316. Both portions can be approximately 180° arcuate segments with one or both being somewhat greater than 180° so that they overlap one another. The rear splash guard 312 can be magnetically suspended from the top deck 46 and can be positioned at a rear of the top deck 46 and a rear of the enclosure 54. The front door 316 can be carried by the shave deck 42 and can be positioned at a front of the shave deck 42 and a front of the enclosure 54. Together the rear splash guard 312 and the front door 316 can surround and circumscribe the enclosure 54, the ice block 14 and the spike plate 62.

The rear splash guard 312 can remain stationary during use, but can be easily removed and replaced for cleaning. In one aspect, the rear splash guard 312 can be suspended from the top deck 46. In one aspect, the rear splash guard 312 can have a magnetic attachment to the top deck 46 so that the rear splash guard 312 can be readily removed and installed for cleaning. Yokes 320 can be coupled to the top edge of the rear splash guard 312. The yokes 320 can each have a slot to receive the rear splash guard 312. The yokes 320 and the rear splash guard 312 can be secured together with fasteners, such as set screws. Corresponding indents 324 can be formed in the bottom of the top deck 46 to receive the yokes 320 for alignment. The indents 324 and the yokes 320 can each have ferromagnetic properties or be ferromagnetic such that the yokes 320 are maintained in the indents 324 by magnetic force, and the rear splash guard 312 is magnetically suspended from the top deck 46. In another aspect, an arcuate channel 328 can be formed in a shield ring 330 carried by the shave deck 42 and located under the rear splash guard 312. Thus, water spray from the ice block 14 and the blade 44 can impact upon the rear splash guard 312, and run off the rear splash guard 312 and into the arcuate channel 328 in the ring 330 of the shave deck 42. Drain openings can be formed in the arcuate channel 328 and the ring 330 to drain water. Thus, water is not sprayed out of the enclosure 54.

The front sliding door 316 can slide open and closed during use. The door 316 can have an open position in which the door 316 is slid around and nesting with the rear splash guard 312, and a closed position in which the door 316 closes the enclosure 54. Thus, the door 316 can allow an ice block 14 to be inserted into the enclosure 54. The door 316 can be carried by the ring 330. The ring 330 can be rotationally and slidably carried by the receptacle 172 of the shave deck 42 and/or the shave disc 168, such as on a perimeter of the slip disc 192 and/or the annular lip 180. Thus, the shave deck 42 can carry the front sliding door 316 and the ring 330 of the guard 50, and the top deck 46 can carry the rear splash guard 312. The door 316 can also have a finger tab 348 extending from the ring 330 to allow the door 316 to be engaged and slid manually. In addition, the door 316 can have a pair of opposite finger tabs 348 extending from opposite sides of the ring to allow the door 316 and the ring 330 to be lifted and removed from the receptacle 172 of the shave deck 42. An operator can precisely lift the ring 330 up and away from the shave deck 42 in a short throw 90-degree lift-pull motion while assisting the operator in the level control removal of the door 316 away from the rear splash guard to minimize impact and scratches.

As described above, the ice shaver 10 can have a tray 38 to accumulate the ice shavings 18. Referring again to FIGS. 1a-3b, the tray 38 can be positioned with a portion between the feet 34 to catch the ice shavings 18. In one aspect, the tray 38 can have a horizontal portion 350 positioned between and on the feet 34 and a vertical portion 354 position against and between the legs 26 and the posts 30. The horizontal portion 354 of the tray 38 can have lateral flanges 358 carried by the feet 34, while the vertical portion 354 can have lateral flanges 362 against a front of the posts 30. In one aspect, the lateral flanges 358 and 362 of the horizontal and vertical portions 350 and 354 can be continuous with one another and raised with respect to the respective horizontal and vertical portions 350 and 354 so that the intermediate portion between the lateral flanges 358 and 362 is recessed and nests between the feet 34 and the posts 30. In another aspect, retaining bumps 366 can extend from distal ends of the feet 34 and received in indentations 370 in the horizontal portion 354, or lateral flanges 354 thereof, of the tray 38 to retain the tray 38. The tray 38 can have a broad scoop shape that rests between the feet 34 and posts 30 for easy removal. In one aspect, the tray 38 can be formed of plastic and can be formed by injection molding. In another aspect, the tray 38 can be at least translucent.

The ice shaver 10, the frame 22 and the legs 26 can have a use configuration, as shown in FIGS. 1a-3a, and a shipping configuration, as shown in FIGS. 17-19. The posts 30 of the legs 26 can define connection ends coupled to the shave deck 42 and the top deck 46, and thus the enclosure 54. In the use configuration, the posts 30 of the legs 26 can be connected to the enclosure 54 so that the enclosure 54 is elevated and the feet 34 are below the enclosure 54. In the shipping configuration, the connection of the posts 30 to the enclosure 54, and the shave deck 42 and the top deck 46, can be reversed so that the feet 34 are above the enclosure 54. Thus, in the shipping configuration, the frame 22, the legs 22 and the feet 34 are reversed to reduce the size of the ice shaver 10 and provide protection to the column 54 and the lever 136 or armature 128 in a shipping container 388.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility to a numerical range endpoint by providing that a given value may be "a little above" or "a little below" the endpoint. It is understood that express support is intended for exact numerical values in this specification, even when the term "about" is used in connection therewith.

The terms "interference fit" and "friction fit" and "press-fit" are terms of art used interchangeably herein to refer to deliberately causing, increasing and/or using friction to deliberately resist movement. An interference fit or friction fit is different than and great than the existence of friction. While friction may exist between any two surfaces, is often desirable to do all one can to reduce this friction. An interference fit or friction fit can be distinguished from naturally occurring friction by being actually deliberately caused and increased. An interference fit can be created by dimensioning engaging parts so that their surfaces tightly bear against one another. A friction fit can be created by surface roughness that is rougher.

The term "ferromagnetic" is used herein to refer to a material or element that has magnetic properties and/or an ability to magnetically couple, either by being magnetic, or being magnetically attracted to a magnet (such as by containing iron) such that one ferromagnetic material or element is magnetically attracted to another ferromagnetic material or element. Thus, a ferromagnetic button is a magnet or is magnetic, such as a permanent magnet, or is attracted to magnets, such as by containing iron.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. An ice shaver configured to shave ice, the ice shaver comprising:
   an enclosure configured to receive an ice block;
   a shave deck with a blade at one end of the enclosure;
   a spike plate in the enclosure opposite the shave deck and movable towards the shave deck and rotatable with respect to the shave deck;
   an opening in the enclosure opposite the shave deck;
   a column extending through the opening in the enclosure and carrying the spike plate, the column and the spike plate movable linearly towards the shave deck;
   a motor carried by and contained within the column and movable with the column toward the shave deck, the motor coupled to the spike plate to rotate the spike plate with respect to the shave deck;
   a perimeter size and shape of the column matching a perimeter size and shape of the opening; and
   the column filling the opening in the enclosure.

2. The ice shaver of claim 1, further comprising:
   the column having a lateral perimeter side wall; and
   the lateral perimeter side wall being solid along substantially an entire height of the column.

3. The ice shaver of claim 1, further comprising:
   the motor having a lateral dimension filling an internal lateral dimension of the column.

4. The ice shaver of claim 1, further comprising:
   a top deck opposite the shave deck and fixed with respect to the shave deck;
   the opening formed in the top deck;
   a guard substantially circumscribing a gap between the top deck and the shave deck; and
   the shave deck, the guard, the top deck and the column defining the enclosure.

5. The ice shaver of claim 4, further comprising:
   a rail extending longitudinally along the column;
   a carriage mount carried by the top deck and receiving the rail of the column; and
   the column being mounted to the top deck and movable linearly through the opening in the top deck via the rail and carriage.

6. The ice shaver of claim 1, further comprising:
   a power supply carried by the column; and
   the power supply comprising an electrical transformer configured to be coupled to an external power source.

7. The ice shaver of claim 6, further comprising:
   a motor control switch carried by the column and electrically coupled to the power supply;
   the motor control switch being operable to activate the motor; and
   the motor control switch movable with the column.

8. The ice shaver of claim 6, further comprising:
   a feedback shaft extending from the motor and into the power supply; and
   a sensor carried by the power supply and electrically coupled to the power supply to sense rotation of the feedback shaft.

9. The ice shaver of claim 6, further comprising:
   a gear box carried by and contained within the column and coupled between an output shaft of the motor and the spike plate; and
   a combined weight of the column, the motor, the gearbox, the power supply, and the spike plate configured to press the ice block against the shave deck.

10. The ice shaver of claim 1, further comprising:
    a handle coupled to the column and positioned forward of the column.

11. The ice shaver of claim 10, further comprising:
    a lever with a proximal end coupled to the handle, a distal end coupled to the enclosure, and an intermediate portion coupled to the column.

12. The ice shaver of claim 11, further comprising:
    a joint between the intermediate portion of the lever and the column; and
    a damper coupled between the column and the lever at the joint.

13. The ice shaver of claim 1, further comprising:
    a thermally insulated shave disc carried by the shave deck opposite the spike plate, the shave disc comprising:

a slip disc configured to receive the ice block thereon; and an isolation pad coupled to the shave deck and carrying the slip disc; and the isolation pad separating and thermally isolating the slip disc from the shave deck.

14. The ice shaver of claim 1, further comprising:

a frame comprising legs with a connection end and feet, the connection end of the legs coupled to the enclosure and having at least two configurations, including:

a use configuration in which the enclosure is elevated and the feet are below the enclosure; and a shipping configuration in which the legs are reversed.

15. An ice shaver configured to shave ice, the ice shaver comprising:

a shave deck with a blade;

a top deck opposite the shave deck and fixed with respect to the shave deck;

an opening formed in the top deck;

a guard substantially circumscribing a gap between the top deck and the shave deck;

a column extending through the opening in the enclosure and movable linearly towards the shave deck;

a perimeter size and shape of the column matching a perimeter size and shape of the opening;

the column filling the opening;

the shave deck, the guard, the top deck and the column defining an enclosure configured to receive an ice block;

a spike plate in the enclosure opposite the shave deck and carried by the column, the spike plate being movable with the column towards the shave deck, and the spike plate being rotatable with respect to the shave deck and configured to rotate the ice block with respect to the blade; and a motor carried by and contained within the column and coupled to the spike plate to rotate the spike plate.

16. The ice shaver of claim 15, further comprising:

the column having a lateral perimeter side wall; and the lateral perimeter side wall being solid along substantially an entire height of the column.

17. The ice shaver of claim 15, further comprising:

a rail extending longitudinally along the column;

a carriage mount carried by the top deck and receiving the rail of the column; and the column being mounted to the top deck and movable linearly through the aperture in the top deck via the rail and carriage.

18. The ice shaver of claim 15, further comprising:

a power supply carried by the column; and the power supply comprising an electrical transformer configured to be coupled to an external power source.

19. The ice shaver of claim 18, further comprising:

a gear box carried by and contained within the column and coupled between an output shaft of the motor and the spike plate; and a combined weight of the column, the motor, the gearbox, the power supply, and the spike plate configured to press the ice block against the shave deck.

20. An ice shaver configured to shave ice, the ice shaver comprising:

a shave deck with a blade;

a top deck opposite the shave deck and fixed with respect to the shave deck;

an opening formed in the top deck;

a guard substantially circumscribing a gap between the top deck and the shave deck;

a column extending through the opening in the enclosure and movable linearly towards the shave deck;

a perimeter size and shape of the column matching a perimeter size and shape of the opening;

the column filling the opening;

the shave deck, the guard, the top deck and the column defining an enclosure configured to receive an ice block;

a spike plate in the enclosure opposite the shave deck and carried by the column, the spike plate being movable with the column towards the shave deck, and the spike plate being rotatable with respect to the shave deck and configured to rotate the ice block with respect to the blade;

a motor carried by and contained within the column and coupled to the spike plate to rotate the spike plate;

a power supply carried by the column and comprising an electrical transformer configured to be coupled to an external power source;

a motor control switch carried by the column and electrically coupled to the power supply, the power control switch being operable to activate the motor, and the power control switch movable with the column;

a gear box carried by and contained within the column and coupled between an output shaft of the motor and the spike plate; and a combined weight of the column, the motor, the gearbox, the power supply, and the spike plate configured to press the ice block against the blade of the shave deck.

\* \* \* \* \*